United States Patent [19]
Nakase et al.

[11] Patent Number: 5,563,855
[45] Date of Patent: Oct. 8, 1996

[54] OPTICAL RECORDING AND REPRODUCING APPARATUS HAVING DISCRETE OPTICAL PICKUP HEADS

[75] Inventors: Hiromi Nakase, Osaka; Wataru Masuda, Hirakata, both of Japan

[73] Assignee: Matsushita Electric Industrial Co., Ltd., Osaka, Japan

[21] Appl. No.: 338,326

[22] Filed: Nov. 14, 1994

[30] Foreign Application Priority Data

Nov. 12, 1993 [JP] Japan ................................ 5-283421

[51] Int. Cl.$^6$ ...................................................... G11B 7/00
[52] U.S. Cl. ................... 369/32; 369/48; 369/58
[58] Field of Search ..................... 369/32, 50, 44.37, 369/48, 54, 58, 47

[56] References Cited

U.S. PATENT DOCUMENTS

| | | | |
|---|---|---|---|
| 4,845,696 | 7/1989 | Ohtsuki et al. | 369/13 |
| 5,148,416 | 9/1992 | Hoshino et al. | 369/32 |
| 5,163,033 | 11/1992 | Yanagi | 369/32 |

FOREIGN PATENT DOCUMENTS 4-170756  6/1992  Japan .

Primary Examiner—Nabil Z. Hindi
Attorney, Agent, or Firm—Ratner & Prestia

[57] ABSTRACT

An optical recording and reproducing apparatus records the audio and video signals to an optical disk by dividing the audio and video signals for one frame into top and bottom audio and video signal components. The top and bottom audio signal component are recorded to a predetermined track on disk sides A and B referenced to the rotation position detection information preformatted thereon, respectively. A mode set panel produces a mode signal for switching the operating mode. A mode determiner produces the head operation mode signal for determining the operating mode of the optical heads based on the signal. Top and bottom heads record and reproduce audio and video signals to or from the two sides A and B, respectively. Top and bottom vertical synchronization mark generators produce the vertical synchronization marks from the sector of the optical disk preformatted for recording and reproducing audio and video signals. Head actuators drive the pickup. The top head operating mode determiner, to which the operating mode data and the vertical synchronization mark signal are input, determines the operating mode of the top optical head. The bottom head mode determiner, to which the operating mode data and the bottom vertical synchronization mark signal are input, determines the operating mode of the bottom optical head.

9 Claims, 27 Drawing Sheets

Fig.11
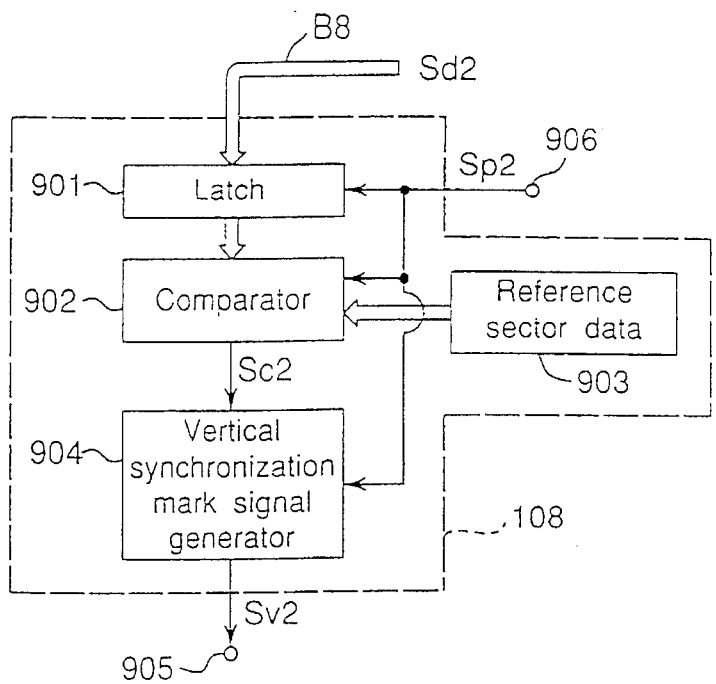
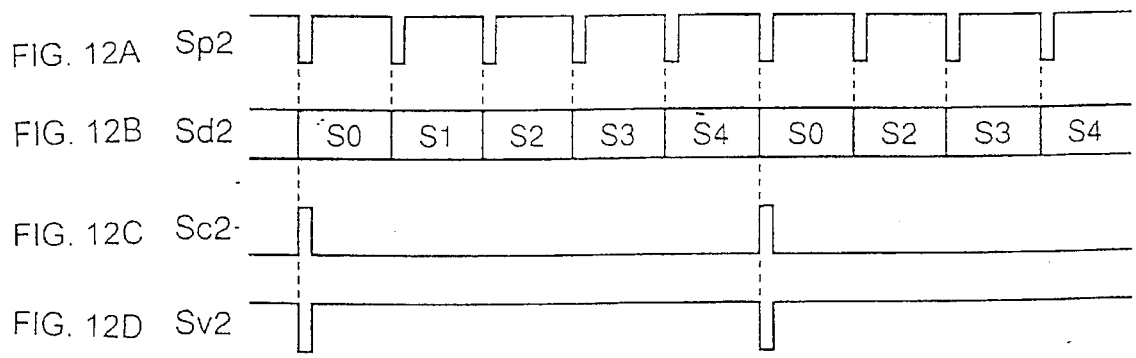
FIG. 12A Sp2
FIG. 12B Sd2
FIG. 12C Sc2
FIG. 12D Sv2

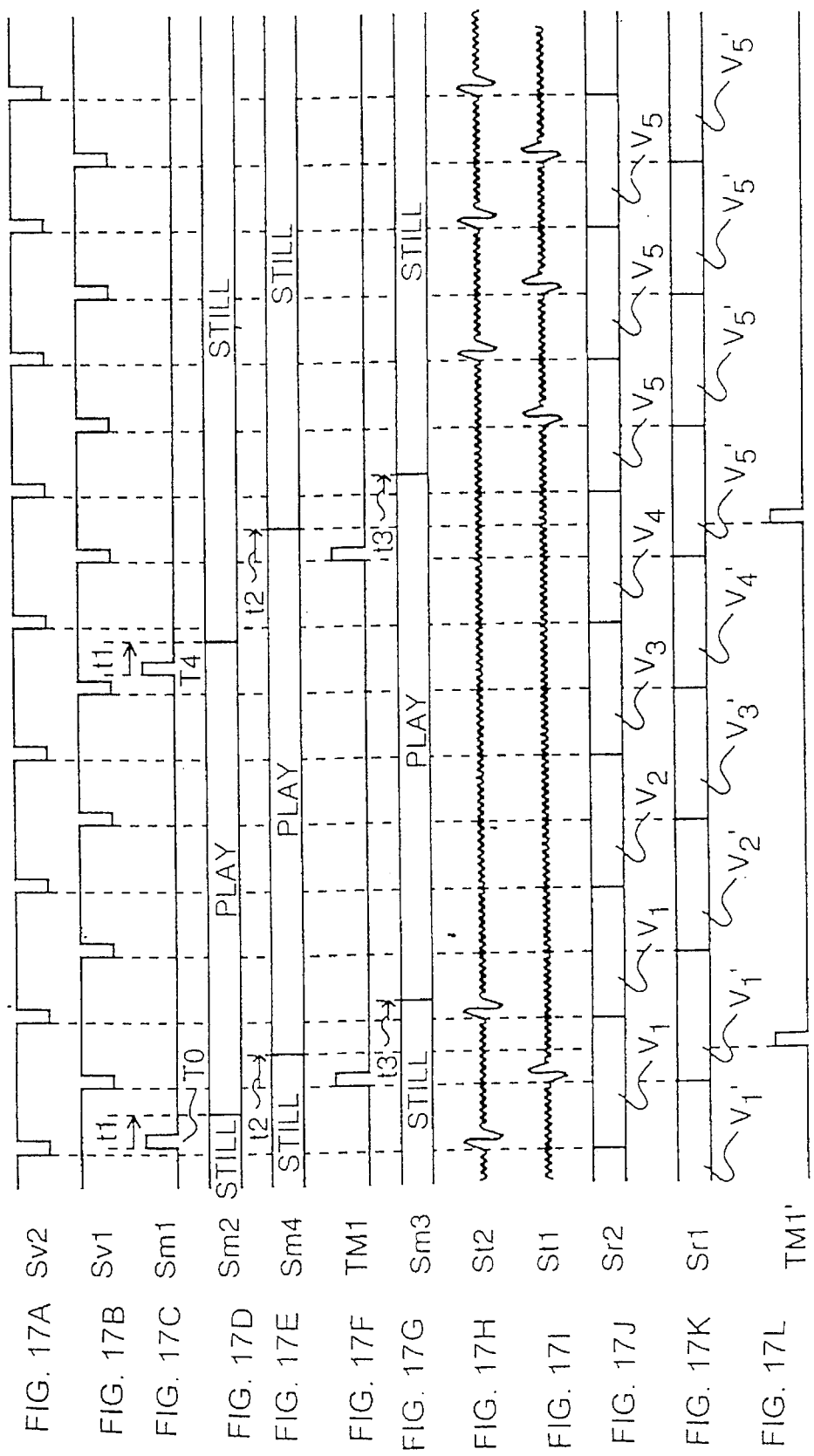

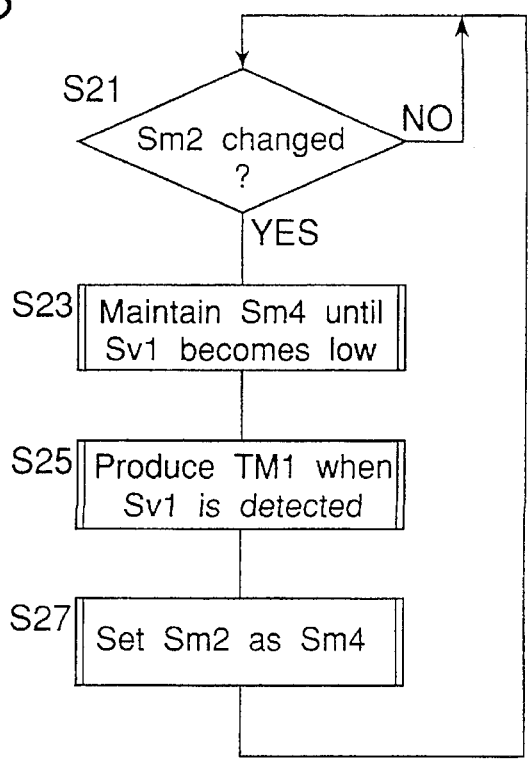
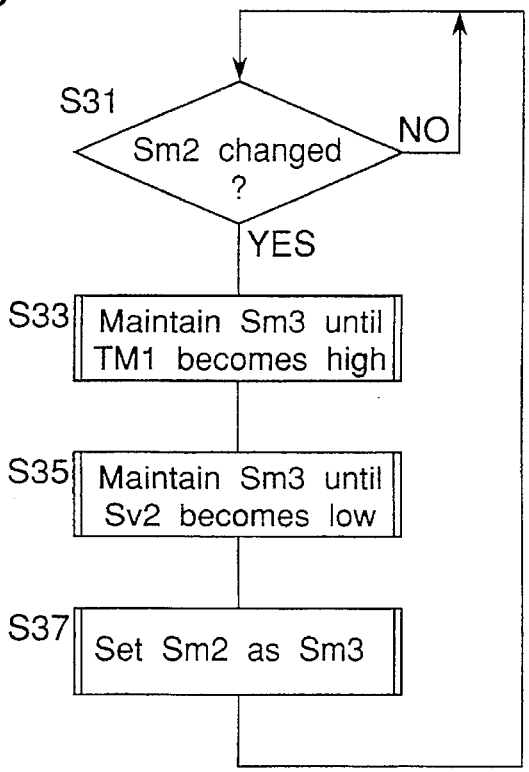

Fig.25
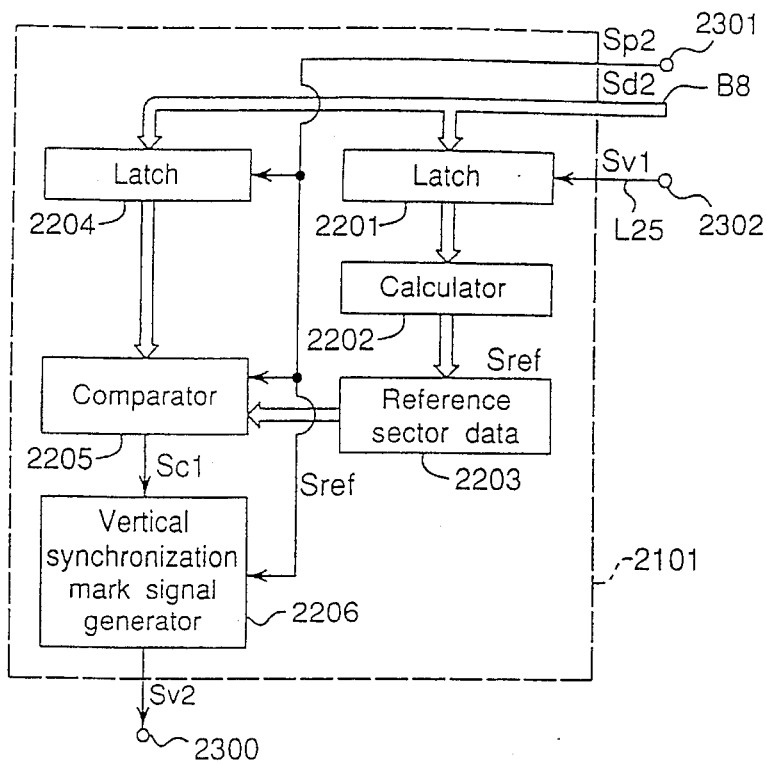
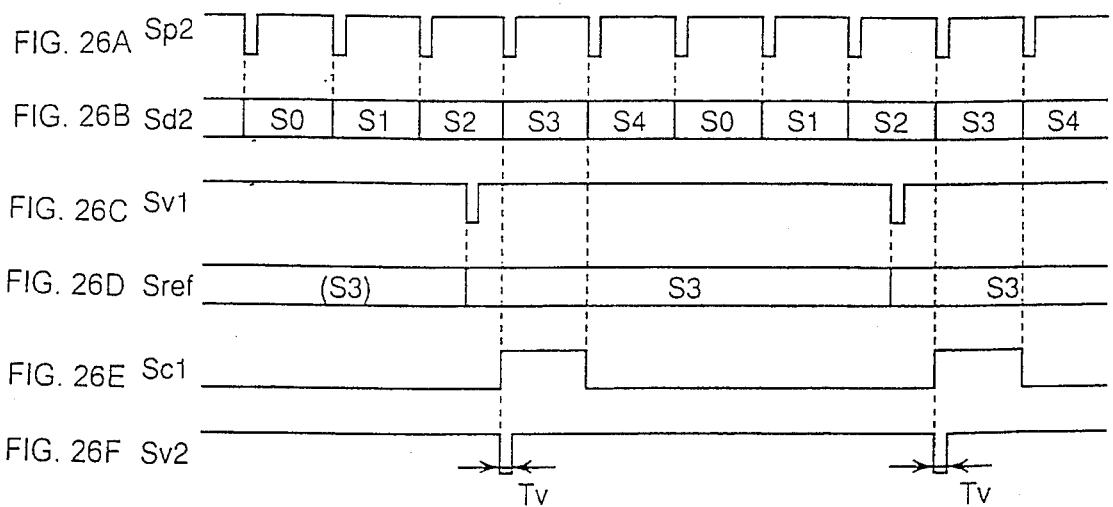
FIG. 26A Sp2
FIG. 26B Sd2
FIG. 26C Sv1
FIG. 26D Sref
FIG. 26E Sc1
FIG. 26F Sv2

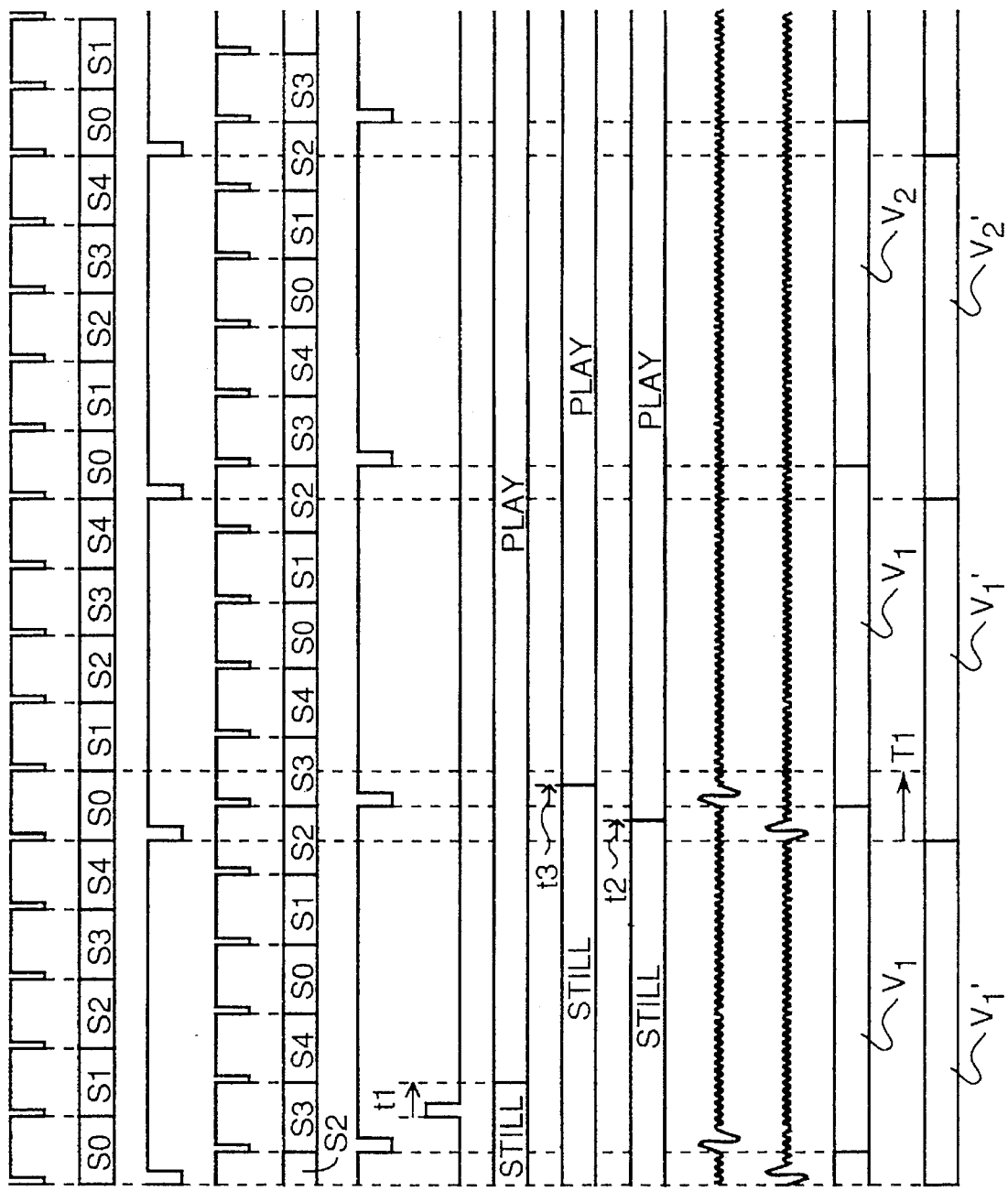

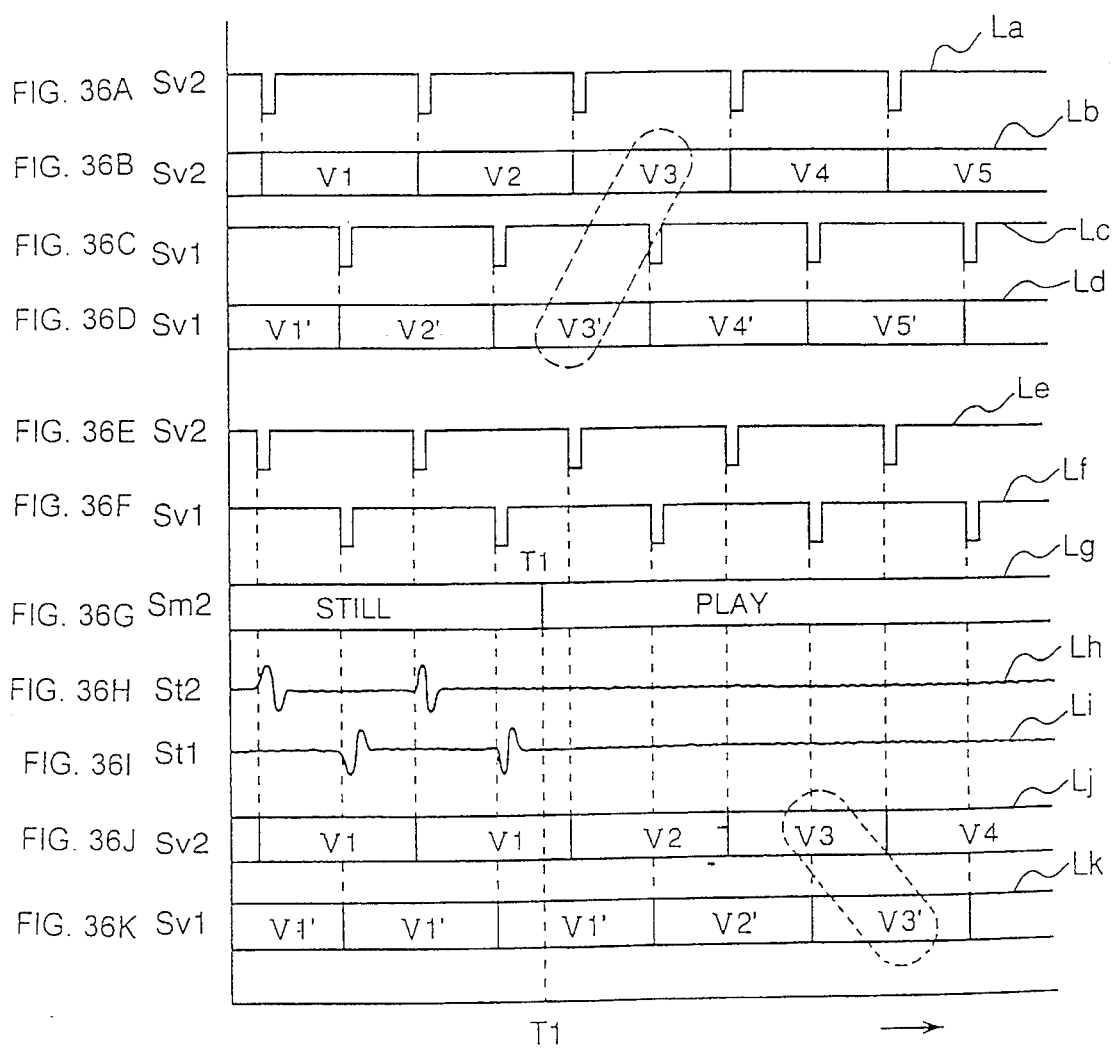

OPTICAL RECORDING AND REPRODUCING APPARATUS HAVING DISCRETE OPTICAL PICKUP HEADS

BACKGROUND OF THE INVENTION

1. Field of the Invention

The present invention relates to an optical recording and reproducing apparatus having discrete optical pickup heads for simultaneously recording or reproducing information signals such as an audio signal and a video signal to or from two recording sides of an optical medium and, more particularly, to the optical recording and reproducing apparatus for synthesizing the audio and video signals recorded separately to specific tracks on each of the two recording sides by two optical heads to output the reproduced audio and video signal.

2. Description of the Prior Art

When digitally coded audio and video signals or signals with a high transfer rate, such as a High Definition Television (HDTV) video signals, are recorded and reproduced by an optical recording and reproducing apparatus, there is a practical limit to the wavelength of the shortest recordable wave (more specifically, the shortest pit length), and it is difficult to sustain the required transfer rate using only one optical head. This has led to the development of multi-channel heads, or more specifically, an increase in the number of optical heads, to assure the required transfer rate, such as described in the Japanese Laid-open Patent Publication No. 4-170756, published Jun. 18, 1992.

With reference to FIGS. 33, 34, and 35, an optical disk used in such a conventional recording and reproducing apparatus is described. In FIG. 35, a side view of the optical disk 1412 which is rotatably supported by a disk motor 1416 is shown. The optical disk 1412 is comprised of a top member having a top recording side SA and a bottom member having a bottom recording side SB. Above the top side SA, a photo sensor 1427 and a top optical pickup (head) 1406 are placed on substantially the same radial line. Below the bottom side SB, a photo sensor 1428 and a bottom optical pickup (head) 1412 are placed on substantially the same radial line. For recording and reproducing operation, the top and bottom heads 1406 and 1412 move on this radial line inwardly and outwardly, respectively.

In FIGS. 33 and 34, plan views of the top and bottom members (sides SA and SB) are shown, respectively. A recording track is formed on each of the top and bottom sides SA and SB spirally extending in a direction reverse to each of rotating directions Rd2 and Rd1 from the outer to the inner and from inner to the outer circumferences, respectively. These spirally wound recording tracks are divided by radial lines 1601 and 1602 into a plurality of semi-tracks V1 to Vn and V1' to Vn', as shown in FIGS. 33 and 34. Each semi-track stores a semi-frame of the recording information thereon. In this case, the reference symbol for each sector represents the number of semi-frame of the information recorded thereon. The information signal for one frame is separately recorded on a corresponding pair (V1 and V1', for example) of semi-tracks on top and bottom sides SA and SB. In other words, the corresponding pair of semi-track separately provided on the opposite sides SA and SB stores one frame of information signal. Position detection members 1427 and 1429 comprised of a reflecting material are provided on the top and bottom sides SA and SB, respectively.

In FIG. 31, a example of such a conventional recording and reproducing apparatus is shown. The optical recording and reproducing apparatus 1400 has two reading and writing optical heads 1426 and 1412 for simultaneously recording or reproducing the information signals to or from two recording sides SA and SB of the optical disk 1415 rotated by the disk motor 1416. A user can instruct the apparatus 1400 to operate at his desirable operation mode by using a mode set panel 1401. The mode set panel 1401 produces a mode instruction signal Sm1 which is the coded result of the ON/OFF state information of operation keys incorporated in the panel 1401. On receipt of this mode instruction signal Sm1, a mode determiner 1402 determines the control of each element of the optical recording and reproducing apparatus 100 based on the current operation mode and the current condition of the apparatus 100, and produces and transfers an operation mode signal Sm2 to a top head controller 1403, a bottom head controller 1409, a motor controller 1417 for controlling the rotation of the disk motor 1416, a recording signal processor, and a reproduced signal processor 1422.

An original recording signal So is fed to the recording signal processor 1418 through an input terminal 1421. From the signal processor 1418, first and second recording signals Sw1 and Sw2 are transferred to a Sw1 signal processor 1420 and a Sw2 signal processor 1419, respectively, and are further transferred to the bottom and top heads 1412 and 1406. The first and second recording signals Sw1 and Sw2 make a pair of information signal for one frame. Based on these recording signals, the heads 1412 and 1406 write the information signals on the aimed tracks on the sides SA and SB, respectively.

The top and bottom heads 1406 and 1412 also reproduce the first and second information signals Sr1 and Sr2 from the tracks formed on the side SA and SB. These reproduced signals Sr1 and Sr2 also make a pair of information signals Sr for one frame of original signal So. The signal Sr1 thus reproduced by the bottom head 1412 is transferred to the bottom head controller 1409, a Sr1 signal processor 1424, and an ID signal generator 1413. Similarly, the signal Sr2 is transferred to the top head controller 1403, a Sr2 signal processor 1423, and an ID signal generator 140. The signals Sr1 and Sr2 are further transferred to the reproduced signal processor 1422 where the information signal for one frame is completed and output through an output terminal 1425.

Based on the reproduced signal Sr1 and Sr2, the ID signal generator 1413 and 1407 demodulates the ID signals Sd1 and Sd2 including the address data output them to the head controllers 1409 and 1403, respectively.

Based on the position signals which the photo sensors 1426 and 1428 produces with respect to the position detection members 1427 and 1429, V mark detectors 1414 and 1408 produce signals Sv1 and Sv2 indicative of V marks Vm1 and Vm2, respectively. The signal Vm1 (Sv1) is transferred to the Sr1 signal processor 1424 and the Sw1 signal processor 1420, and the signal Vm2 (Sv2) is transferred to the Sr2 signal processor 1423 and the Sw2 signal processor 1419.

Based on these signals Sv1, Sm2, and Sd1, the top head controller 1403 controls the movement of the top head 1406 through a top head driver 1404 and top head actuator 1405. Similarly, the bottom head controller 1409 controls the movement of the bottom head 1412 through a bottom head driver 1410 and a bottom head actuator 1411, based on the signal Sv2, Sm2, and Sd2.

In FIG. 32, the details of the head controller 1403 and 1409, the head drivers 1404 and 1410, the head actuator 1405 and 1411, and the heads 1426 and 1428 are shown. The head controllers 1403 and 1409 have focus controllers 1501 and 1517, tracking controllers 1502 and 1518, and linear motor controller 1503 and 1519, respectively. The head drivers 1404 and 1410 have focus drivers 1505 and 1520, tracking drivers 1505 and 1521, respectively. The head actuators 1405 and 1411 have focus actuators 1507 and 1523, tracking actuators 1508 and 1524, and linear motor 1509 and 1411, respectively. The heads 1406 and 1412 have focus error signal generator 1510 and 1526, tracking error signal generators 1511 and 1527, motor speed signal generators 1512 and 1528, reproduced signal generators 1513 and 1529, laser diodes 1514 and 1530, and input terminal 1515 and 1531, respectively. These are connected to each other by lines or signal line as shown in FIG. 32.

The top tracking controllers 1502 produces a top track jump signal St2, as synchronized with the input of top vertical synchronization signal Sv2, for controlling the head driver 1404 and head actuator 1405 to instruct the top head 1406 to jump over the predetermined number of tracks. Similarly, the bottom tracking controller 1518 produces a bottom track jump signal St1, as synchronized with the input of the signal Sv1, for jumping the bottom head 1412 over a predetermined number of tracks.

In such cases, optical heads are provided discretely for the two recording sides SA and SB of the optical disk 1412 in attempt to increase a transfer rate, however, wherein the operating mode selection timing of the head actuators is not set separately for reading and writing heads 1406 and 1412 each for the side SA and side SB and head B) according to the offset of the signal recording positions on recording sides SA and SB of the optical disk 1412. Therefore, the relationship between the specific combination of track addresses scanned by head 1406 and head 1412 becomes disrupted when changing operating modes. Then, even if the head positions are corrected so that the values of the track addresses output from heads 1406 and 1426 are restored to the specified correlation based on the track addresses reproduced from head 1406 and head 1412, the reproduced image becomes disrupted whenever the timing is offset from the predetermined correlation between the head positions of heads 1406 and 1412, and a reproduced image of consistent quality cannot be obtained.

This problem is described below with reference to FIGS. 36A–36K. Wave lines La, Lb, Lc, and Ld show the top V-mark signal Sv2, the top reproduced signal Sr1, the bottom V-mark signal Sv1, respectively, when the information signals are reproduced without changing operation mode without any problem. These V-mark signals provide the reference for the video signal recording position in each disk track, and one frame of the video signal is divided between the top and bottom heads and recorded between one V-mark signal and the next V-mark signal (for example, video data V3 and V3' are combined to form the video signal for one frame). As a result, the corresponding reproduced signals Sr1 and Sr2 makes a complete pair of the semi-frame signals V3 and V3'.

Wave lines Le, Lf, Lg, Lh, Li, Lj, and Lk show the top V-mark signal Sv2, the bottom V-mark signal Sv1, operation mode signal Sm2, top track jump signal St2, bottom track jump signal St1, the top reproduced signals St2, and the bottom reproduced signal Sr1 when the reproducing mode is changed from "still" to "play" at time T1 by the operation signal Sm2. According to the track jump signal St2, the top head 1406 jumps to the outer track at the position indicated by the radial line 1601 (FIG. 33) where the information semi-frame changes. The bottom head 1412 jumps to the inner tracks at the position indicated by the radial line 1602 (FIG. 34) according to the track jump signal St1. In other word, both the top and bottom heads 1406 and 1412 repeats to scan the current semi-track according to the track jump signals St2 and St1 even when the current semi-track is scanned over.

Therefore, when the reproducing mode (signal Sm2) changes from the "still" to the normal "play" at time T1, the bottom head 1412 reproduces the information of semi-track V1' again. Because the "still mode" remains selected until time T1, the still jump wave form is output when the V-mark signal is detected, and video data V1 is reproduced from the top head again and again. When the still mode OFF command is input at T1 and the still OFF mode is selected, the still jump wave form is not output, and the video data reproduced from the top head advances normally V1, V2, . . . Vn.

Similarly, the correlation between the bottom V-mark signal St1 and the reproduced video signal Sr1. Because the still mode remains selected until time T1, the still jump wave form is output when the V-mark signal is detected, and video data V1' is reproduced from the bottom head again and again. When the still mode OFF command is input at T1 and the still OFF mode is selected, the still jump wave form is not output, and the video data reproduced from the bottom head advances normally V1', V2', . . . Vn'. In this case, the combination of video data output from the top and bottom heads becomes offset from the predetermined combination, e.g., V3 and V2', and the reproduced video is therefore not the correct video.

It should be noted here that double-sided optical disk media are generally manufactured by combining single-sided optical disk media produced in the same manufacturing process. To dynamically balance the disk media when bonding the two single-sided media together, the offset between the vertical synchronization marks of disk SA and disk SB during bonding may range from a maximum 0 (zero) degrees to 360 degrees.

It is therefore possible that a normal reproduction image cannot be obtained by means of the prior art as described above depending upon the timing relative to the V-mark signals of the top and bottom heads at which the operating mode is changed

SUMMARY OF THE INVENTION

The object of the present invention is therefore to provide a connector which solves these problems.

The present invention has been developed with a view to substantially solving the above described disadvantages and has for its essential object to provide an improved connector.

In order to achieve the aforementioned objective, a system control apparatus for an optical disk recording and reproducing apparatus for recording to an optical disk medium comprising: top rotation position detection information preformatted to a predetermined rotational position on side A of the disk medium, and bottom rotation position detection information preformatted to a predetermined rotational position on side B of the disk medium, by dividing the audio and video signals for one frame into top and bottom audio and video signal components, recording the top audio and video signal component to a predetermined track position on disk side A referenced to the top rotation position detection information preformatted on side A, and recording the bottom audio and video signal component to a predetermined track position on disk side B referenced to the bottom rotation position detection information preformatted on side B, and comprising: a mode setting input means for inputting the mode information for switching the operating mode of the optical disk recording and reproducing apparatus; a mode setting means for setting the operating mode of the optical disk recording and reproducing apparatus based on the mode setting input data output from the mode setting input means; a top optical head comprising: a pickup means for emitting a laser beam to disk side A for recording and reproducing audio and video signals, and a head actuator for driving the pickup means; a top control means for controlling the top optical head; a top rotation position detection means for detecting the top rotation position detection information preformatted to optical disk side A, and generating a top rotation position detection signal; a bottom optical head comprising: a pickup means for emitting a laser beam to disk side B for recording and reproducing audio and video signals, and a head actuator for driving the pickup means; a bottom control means for controlling the bottom optical head; a bottom rotation position detection means for detecting the bottom rotation position detection information preformatted to optical disk side B, and generating a bottom rotation position detection signal; and an optical head operating mode setting means to which the operating mode data output from the mode setting means is input and the top and bottom rotation position detection signals are input, and which sets the operating mode of the top optical head and outputs a control command to the top control means, and sets the operating mode of the bottom optical head and outputs a control command to the bottom control means; and which is characterized by the optical head operating mode setting means outputting the operating mode of the head actuator for the top optical head at the predetermined timing to the top control means, and outputting the operating mode of the head actuator for the bottom optical head at the predetermined timing to the bottom control means, based on the input timing of the top rotation position detection signal and the input timing of the bottom rotation position detection signal.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 11 is a block diagram showing the details of the Sv2 signal generator of the optical recording and reproducing apparatus of FIG. 1, FIGS. 12A–12D is a graph showing signals observed in the Sv2 signal generator of FIG. 11.

FIGS. 17A–17L is a graph showing various signals observed in the optical recording and reproducing apparatus of FIG. 16 during the reproducing operation, FIG. 18 is a flow chart showing the bottom head mode determining operation by the optical recording and reproducing apparatus of FIG. 16, FIG. 19 is a flow chart showing the top head mode determining operation by the optical recording and reproducing apparatus of FIG. 16, FIG. 25 is a block diagram showing the details of the Sv2 signal generator of the optical recording and reproducing apparatus of FIG. 24, FIGS. 26A–26F is a graph showing signals observed in the Sv2 signal generator of FIG. 25, FIGS. 27A–27N is a graph showing signals observed in the optical recording and reproducing apparatus of FIG. 24, FIGS. 36A–36K is a graph showing various signals observed in the optical recording and reproducing apparatus of FIG. 31 during the reproducing operation.

DETAILED DESCRIPTION OF THE PREFERRED EMBODIMENTS

First embodiment

Figure 1:
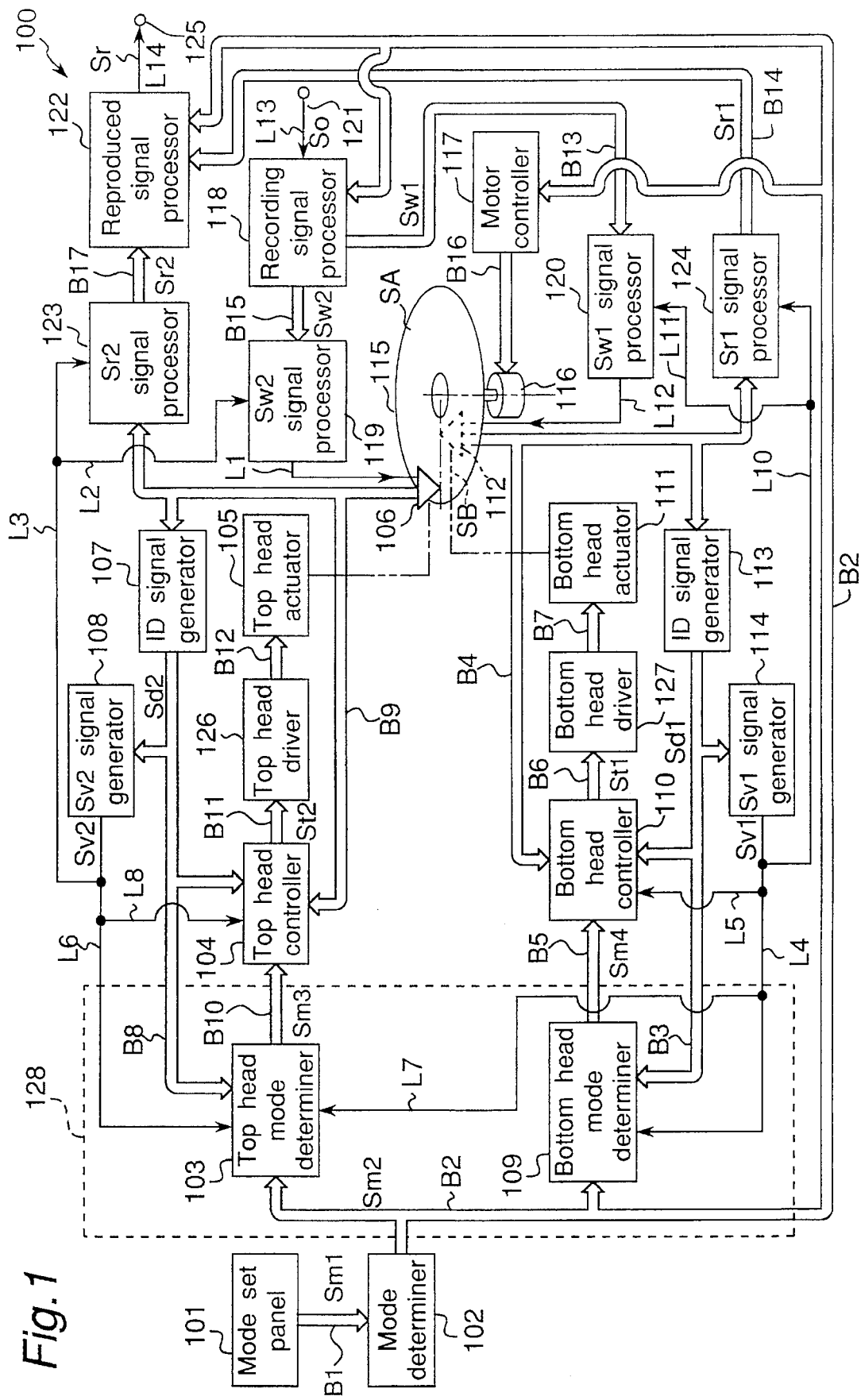
FIG. 1 is a block diagram showing an optical recording and reproducing apparatus according to a first embodiment of the present invention.

Referring to FIG. 1, an optical recording and reproducing apparatus, used for an optical disk 115 having two recording area provided on the opposite sides, according to the present invention is shown. The optical recording and reproducing apparatus 100 includes top and bottom head 106 and 112 provided beside the top and bottom recording side SA and SB, respectively, for simultaneously recording or reproducing the information signals thereto or therefrom. The optical disk 115 is rotated by a disk motor 116. The motor 116 is controlled by a motor controller 117 connected thereto by a signal line B16.

Figure 7:
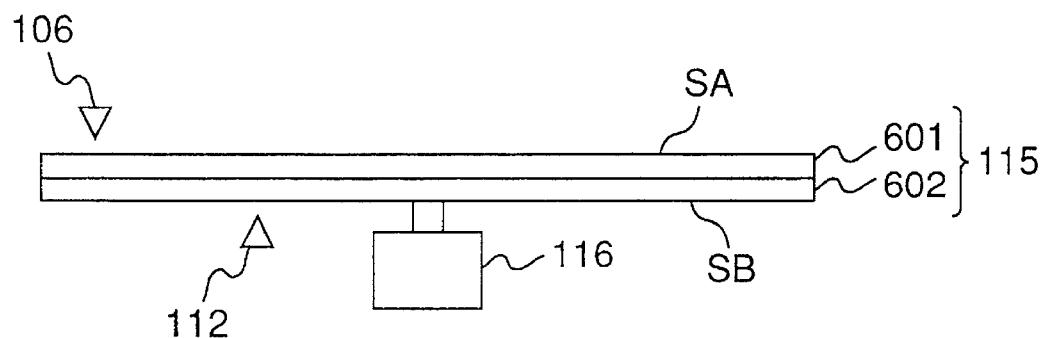
FIG. 7 is a side view showing the optical disk rotatably supported by the disk motor according to the present invention.
Figure 35:
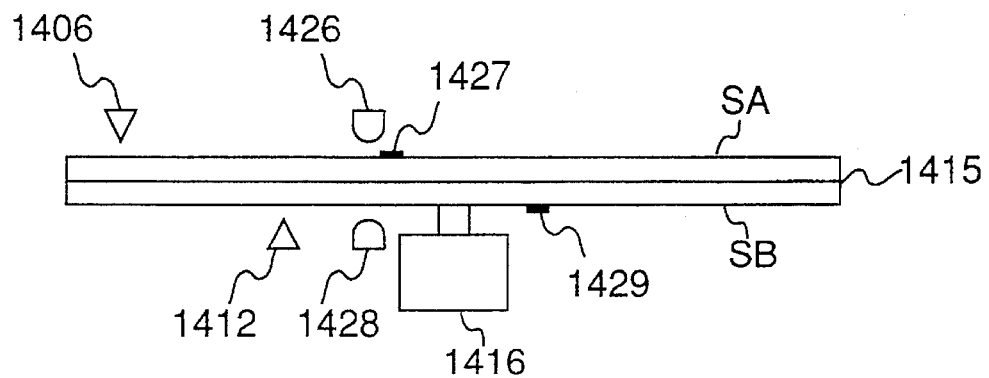
FIG. 35 is a side view showing the optical disk which is set to the optical recording and reproducing apparatus of FIG. 31.

Referring to FIG. 7, a side view of the optical disk 115 is shown. The optical disk 115 is comprised of a first recording member 601 having a first recording side SA and a second recording member 602 having a second recording side SB. At the initial stage for recording operation, the top head 106 and the bottom head 112 are located on the outer circumferential side and the inner circumferential side of the disk 115.

Figure 8:
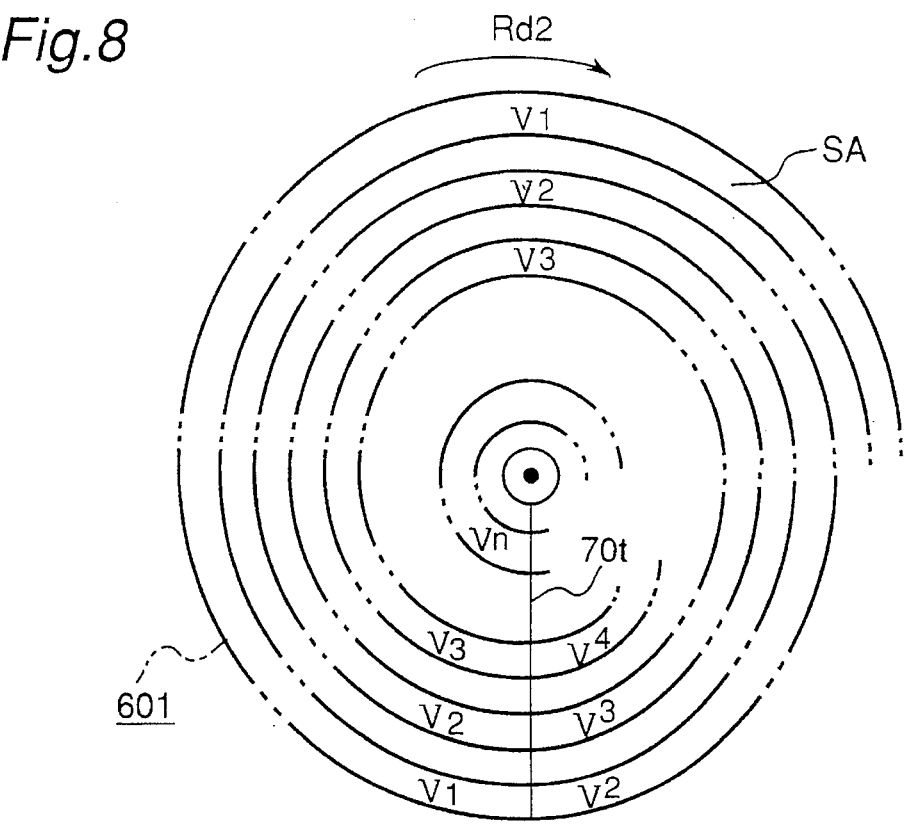
FIG. 8 is a plan view showing the top side of the optical disk of FIG. 7.

Referring to FIG. 8, a plan view of the first recording member 601 of the disk 115 is shown. In operation, the first recording member 601 rotates in a direction indicated by an arrow Rd2. The first recording member 601 has a recording track formed on the recording side SA thereof as schematically indicated by phantom lines. This track is spirally extending or wound in the reversed direction to the rotating direction Rd2 from the outer to the inner circumference as if a plurality of tracks are formed thereon. This spirally wound recording track is divided by a radial line 701 into a plurality of semi-tracks V1 to Vn which are arranged in order from the outside to the inside, as best shown in FIG. 8. Each semi-track stores a semi-frame of the recording information thereon. In this case, the reference symbol for each sector represents the number of semi-frame of the information recorded thereon.

Figure 9:
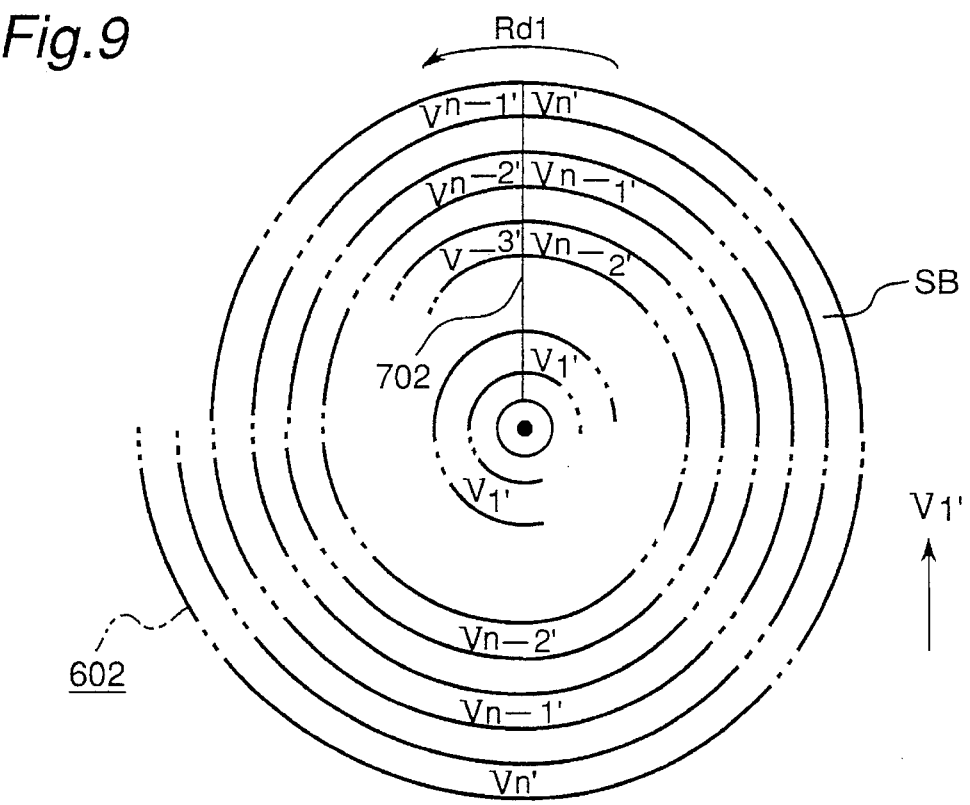
FIG. 9 is a plan view showing the bottom side of the optical disk of FIG. 7.
Figure 10:
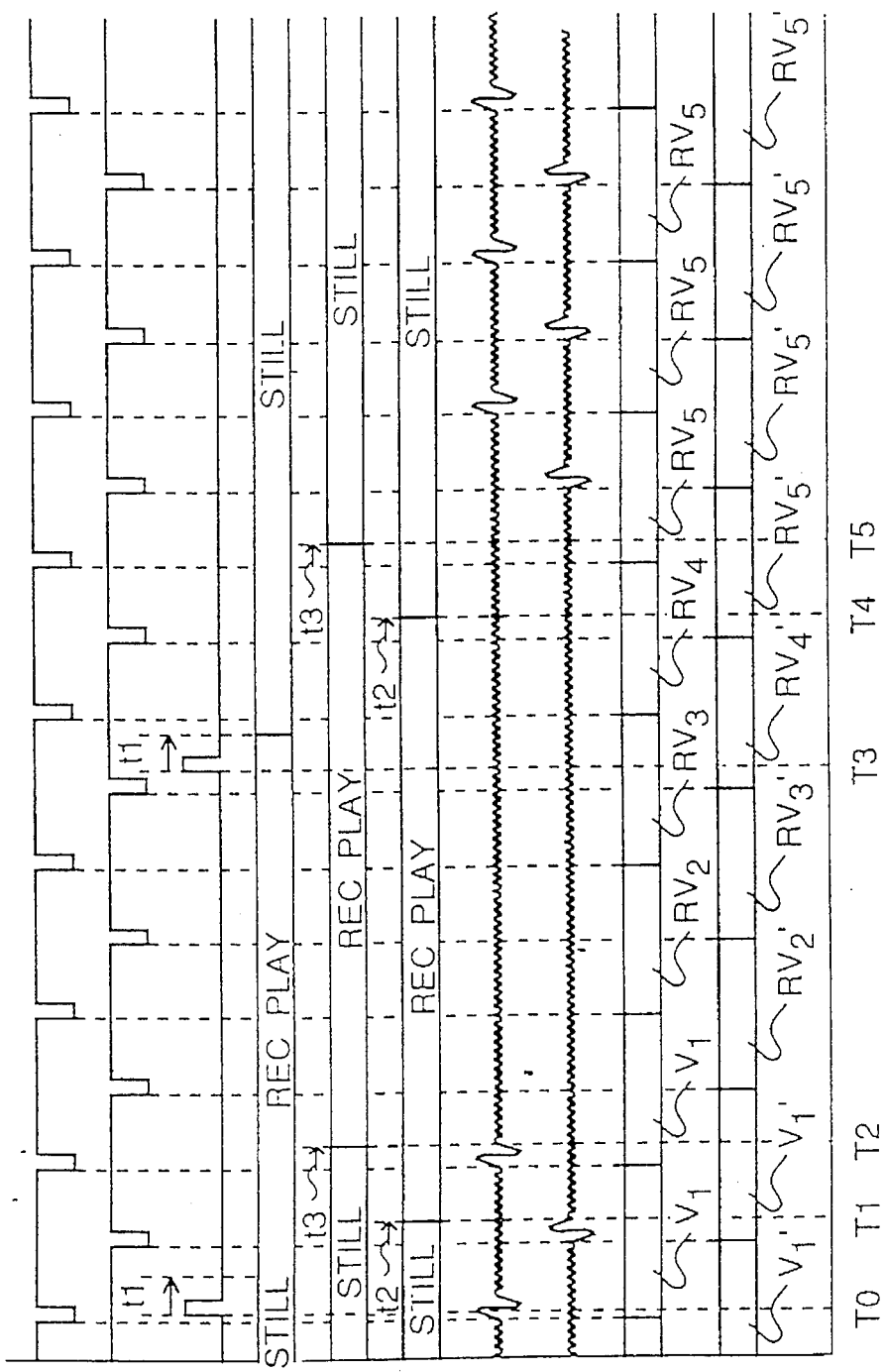
FIGS. 10A–10J is a graph showing various signals observed in the optical recording and reproducing apparatus of FIG. 1 during the recording operation.

Referring to FIG. 9, a plan view of the second recording member 602 of the disk 115 is shown. In operation, the second recording member 602 rotates in a direction indicated by an arrow Rd1. The second recording member 602 has a recording track spirally extending or wound in the reversed direction to the rotating direction Rd1 from the inner to the outer circumference as if a plurality of tracks are formed thereon. This wound recording track is divided by a radial line 702 into a plurality of semi-tracks V1' to Vn' Each of semi-track V1' to Vn' stores a semi-frame of the recording information thereon, and the reference symbol for each sector represents the number of semi-frame of the information recorded thereon. Since the top and bottom heads 106 and 112 move outwardly and inwardly to access the semi-tracks in order for the recording or reproducing operation, as described previously, the information signal for one frame is separately recorded on a corresponding pair (V1 and V1', for example) of semi-tracks on top and bottom sides SA and SB constant. In other words, the corresponding pair of semi-track separately provided on the opposite sides SA and SB stores one frame of information signal.

Figure 13:
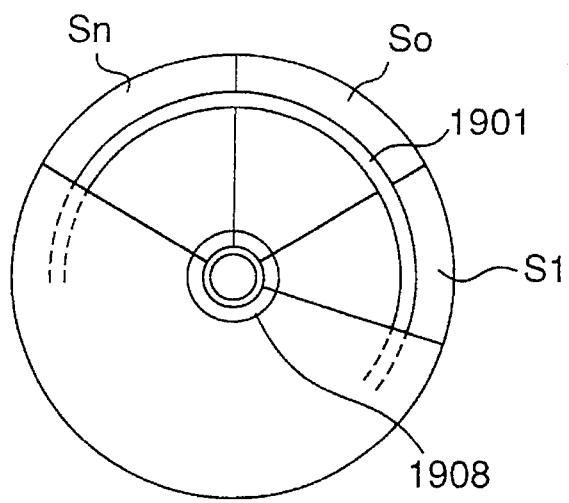
FIG. 13 is a graph in assistance of explaining the construction of the recording track formed on the optical disk according to the present invention.
Figure 14:
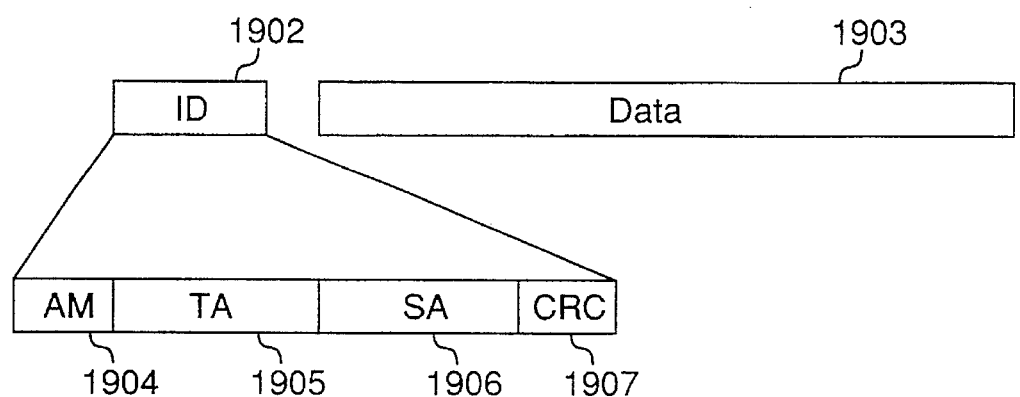
FIG. 14 is a graph showing a sector configuration in assistance of explaining the format of optical disk of FIG. 13 after preformatting according to the present in the present invention.

With reference to FIGS. 13 and 14, the construction of each semi-track is described. In FIG. 13, only one semi-track 1901 is partially shown for the sake of brevity. The semi-track 901 is divided into plural sectors S0 . . . Sn, as shown in FIG. 14. Each sector comprises an ID unit 1902 and a data recording area 1903. Each ID unit 1902 starts with an address mark (AM) 1904, and includes a track address (TA) 1905, sector address (SA) 1906, and error correction CRC 1907 for use when reproducing the track address 1905 and sector address 1906. A TOC portion 1908 wherein the information of every tracks, semi-tracks, and sectors together with the information recorded therein is stored.

Referring back to FIG. 1, the optical recording and reproducing apparatus 100 includes an input terminal 121 from which an original information signal So is input. A recording signal processor 118 is connected to the input terminal 121 by a line L13 for receiving the information signal So to produce first and second recording signals Sw1 and Sw2. The recording signal processor 118 is further connected to top recording signal processor 119 by signal line B15 for transmitting the first recording signal thereto and the bottom recording signal processor 120 by a signal line B13 for transmitting the second recording signal thereto. The line and signal line represent electrical paths for transferring one signal and one or more signals, respectively.

The top optical head 106 is connected to the second recording signal processor (referred to as a "Sw2 signal processor") 119 and the second reproduced signal processor (referred to as a "Sr2 signal processor") 123 by a line L1 and a signal line B9, respectively. Through the line L1, the second recording signal Sw2 is fed to the top head 106 for writing on the aimed track of the top side SA. Through the signal line B9, the second reproduced information signal Sr2 read out from the aimed track of top side SA is fed to the Sr2 signal processor 123. The Sr2 signal processor 123 is connected to a reproduced signal processor 122.

The bottom head 116 is connected to the first recording signal processor (referred to as a "Sw1 signal processor") 120 and a first reproduced signal processor (referred to as a "Sr1 signal processor") 124 by a line L12 and a signal line B13, respectively. Through the line L12, the first recording signal Sw1 is fed to the bottom optical head 112 for recording to the bottom recording side SB. Through the line B4, the first reproduced signal Sr1 read out from the side SB is fed to the Sr1 signal processor 124.

The reproducing signal processor 122 is further connected to the first reproduced signal processor 124 by a signal line B14 for receiving the first reproduced signal Sr1 and to the second reproduced signal processors 123 by a signal lines B17 for receiving the second reproduced signal St2. Based on the first and second reproduced signals Sr1, and Sr2, the reproduced signal processor 122 completes one frame of reproduced signal Sr.

The optical recording and reproducing apparatus 100 includes a mode setting panel 101 and a mode determiner 102 which are connected to each other by a signal line B1. The mode set panel 101 has operation keys (not shown) by which the user can select and instruct the apparatus 100 to operate at his selected operation mode, and produces a mode selection signal Sm1 which is the coded result of the ON/OFF state information of keys. On receipt of this mode selection signal Sm1 through the signal line B1, the mode determiner 102 determines the operation mode of each element of the optical recording and reproducing apparatus 100 based on the current operation mode and the current condition of the apparatus 100, and produces an operation mode signal Sm2. The mode determiner 102 is further connected to a top head mode determiner 103, a bottom head mode determiner 109, the motor controller 117, a recording signal processor 118, a reproduced signal processor 122, and the motor controller 117, the recording signal processor 118, and the reproduced signal processor 122 by a signal line B2 for transferring the operation mode signal Sm2 thereto.

The bottom head operation mode determiner 109 is connected to a bottom ID signal generator 113 and a Sv1 signal generator 114 by a signal line B3 and a line L4, respectively. The ID signal generator 113 is connected to the bottom head 112 by a signal line B4 for receiving the information signal reproduced from the bottom side SB of optical disk 115 to generate a bottom ID signal Sd1 indicative of address data and sector data. The Sv1 signal generator 114 is also connected to the ID signal generator 113 by the signal line B3 for receiving the bottom ID signal Sd1 to produce a first rotation position detection signal Sv1 which are generally referred to as "a V-mark signal", indicative of the reference position for recording on the bottom side SB. Based on the signals Sv1, Sd1, and Sm2 the bottom head mode determiner 109 determines the operating mode of the bottom head 112 to produce a bottom head operation signal Sm4. The operation of the bottom head mode determiner 109 is described later with reference to FIG. 5.

A bottom head actuator 111 is provided for moving the bottom head 112, and is connected to a bottom head driver 127 by a signal line B7. A bottom head controller 110 is connected to the bottom head mode determiner 109 by a signal line B5 for receiving the signal Sm4, to the ID signal generator 113 by the signal line B3 for receiving the ID signal Sd1, to the line L4 by a line L5 for receiving the signal Sv1, and, to the bottom head 112 by the signal line B4 for receiving the reproduced information signal. Based on the signals Sm4, Sd1, and Sv1, the bottom head controller 110 produces a bottom head control signal St1 for controlling the movement of the bottom head 112. The bottom head driver 127 is connected to the bottom head controller 110 by a signal line B6 for receiving the control signal St1 therethrough to produce a driving signal for instructing the bottom head actuator 111 to move the bottom head 112 in the radial direction with respect to the disk 115 to position just below the aimed track on the bottom recording side SB. Thus, the arrangement of bottom head controller 110, bottom head driver 127, bottom head actuator 111, and bottom head 116 constructs a bottom head positioning system, whose details will be described later with reference to FIG. 3.

The top head mode determiner 103 is connected to a top ID signal generator 107 and a Sv2 signal generator 108 by a signal line B8 and a line L6, respectively. The details of the Sv2 signal generator 108 will be described later with reference to FIG. 11. The ID signal generator 107 is connected to the top head 106 by a signal line B9 for receiving the information signal reproduced from top side SA of the optical disk 115, and generates a top ID signal Sd2 indicative of address data and sector data. The Sv2 signal generator 108 is also connected to the ID signal generator 107 by the signal line B8 for receiving the ID data signal Sd2 to produce a second vertical synchronization mark detection signal Sv2 indicative of the reference position for recording on the top side SA. The top head mode determiner 103 is further connected to the line L5 by a line L7 for receiving the signal Sv1 from the Sv1 signal generator 114. Based on the signals Sv1, Sv2, Sd2, and Sm2, the top head mode determiner 103 determines the operating mode of the top head 106 to produce a top head operation signal Sm3. Thus, bottom head mode determiner 103 and the top head mode determiner 109 construct an optical head operation mode determiner 128 for determining the comprehensive movement of the optical heads 112 and 106 as the recording and reproducing apparatus 100. The operation of the top head determiner 103 is described later with reference to FIG. 6.

A top head controller 104 is connected to the top head mode determiner 103 by a signal line B10 for receiving the signal Sm3, to the ID signal generator 107 by the signal line B8 for receiving the ID signal Sd2, to the line L6 by a line L8 for receiving the signal Sv2, and to the top head 106 by the signal line B9. Based on the signals Sm3, Sd2, and Sv2, the top head controller 104 produces a top head control signal St2. A top head driver 126 is connected to the top head controller 104 by a signal line B11 for receiving the top head control signal St2 to produce a top head driving signal. The top head driver 126 is further connected to the top head actuator 105 by a signal line B12 through which the driving signal is transferred to the actuator 105. Based on this driving signal, the actuator 105 controls the movement of top head 106 in the radial direction with respect to the disk 115 so that the bottom head 112 can be positioned just above the aimed track on the top recording side SA. Thus, the arrangement of top head controller 104, top head driver 126, top head actuator 105, and top head 106 constructs a top head positioning system, whose details will be described with reference to FIG. 3.

Figure 2:
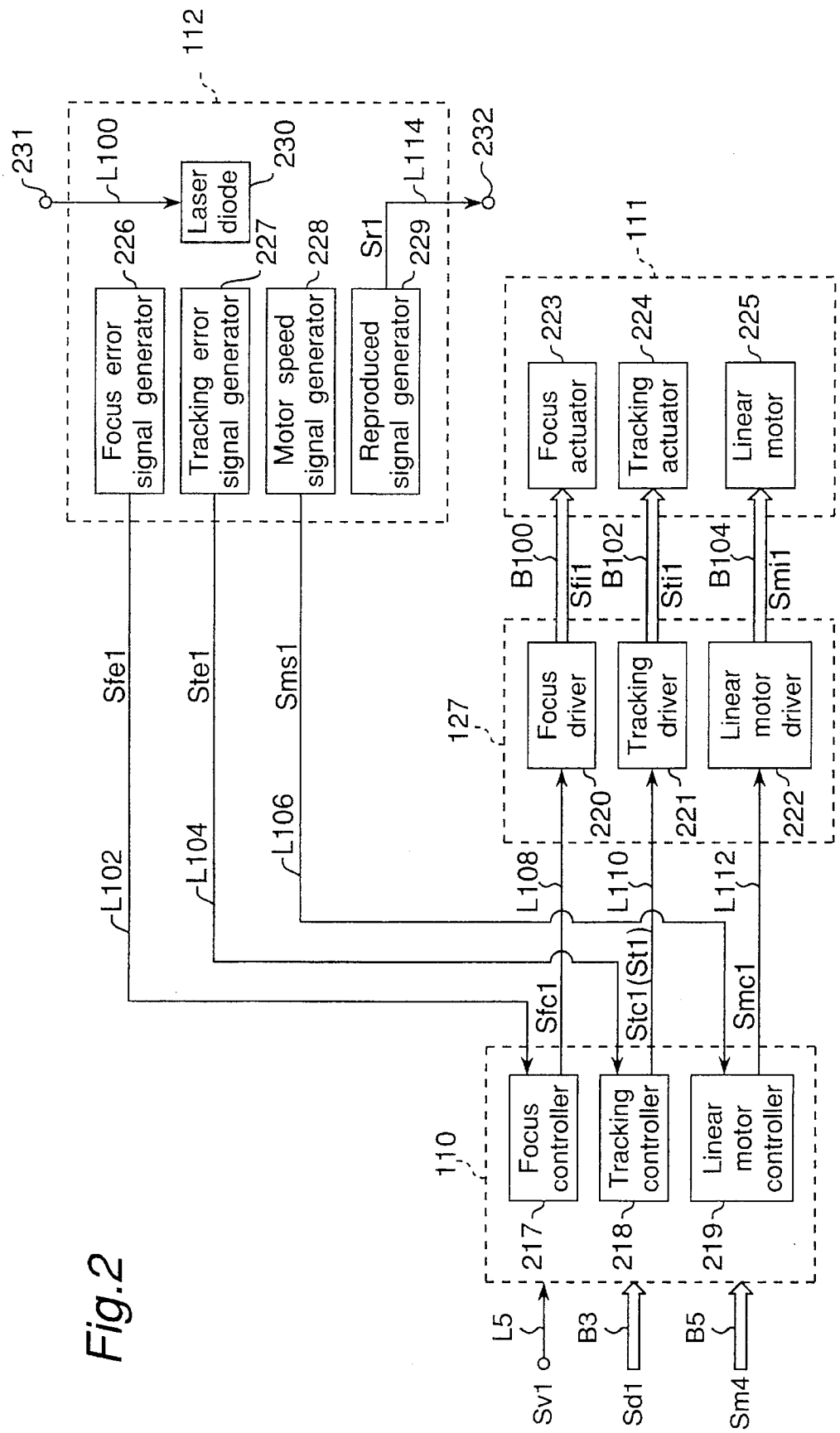
FIG. 2 is a block diagram showing the details of bottom head actuator of the optical recording and reproducing apparatus of FIG. 1.

Referring to FIG. 2, the detailed constructions of the bottom head positioning system are shown. The bottom head 112 has a first laser diode 230 for impinging a laser beam (not shown) for recording, reproducing, or erasing the information upon recording tracks on the bottom side SB of the disk 115. An input terminal 231 is connected for the line L12 for receiving the recording signal from the Sw1 signal processor 120. The laser diode 230 is also connected to the input terminal 231 by a line L100 for recording the signals on the disk SB based on the first recording signal. A first focus error signal generator 226 comprised of a photo detector for receiving the laser beam reflected by the disk SB and an amplifier is provided for generating a first focus error signal Sfe1 based on the reflected laser beam received by the photo detector. A first tracking error signal generator 227 comprised of a photo detector for receiving the laser beam reflected by the disk SB and an amplifier is provided for generating a first tracking error signal Ste1 based on the reflected laser beam received by the photo detector. A first motor speed signal generator 228 comprised of coil, magnet, and amplifier is provided for detecting the moving speed of a first linear motor 225 to generate a first motor speed signal Sms1 indicative of the moving speed of the bottom head 112. A first reproduced signal generator 229 comprised of a photo detector for receiving the laser beam reflected by disk SB and an amplifier is provided for reproducing the information signal recorded on the track of disk 115 as the first reproduced signal Sr1 based on the reflected laser beam received by the photo detector. An output terminal 232 is connected to the reproduced signal generator 229 by a line L114 and to the signal line B4 for outputting the reproduced signal therefrom.

The bottom head controller 110 has a first focus controller 217 connected to the first focus error signal generator 226 by a line L102 for producing a first focus control signal Sfc1 based on the focus error signal. A first tracking controller 218 is connected to the first tracking error signal generator 227 by a line L104 for producing a first tracking control signal Stc1 based on the first tracking error signal Ste1 so that the bottom head 112 traces the aimed track. The first tracking controller 218 also produces a first track jump signal St1 instead of the first tracking control signal Stc1 when the signal Sm4 instructs the still play-mode and the first synchronization signal Sv1 is detected so as to jump the bottom head 112 to other track over a predetermined number of tracks when the reproducing mode is changed by the user from normal to still or from still to normal. A first linear motor controller 219 is connected to the first motor speed signal generator 228 by a line L106 for producing a first motor control signal Smc1 to control the moving speed of the first linear motor 225.

The bottom head driver 127 has a first focus driver 220 connected to the first focus controller 217 by a line L108 for producing a first focus actuator driving signal Sfi1 based on the first focus control signal Sfc1. A first tracking driver 221 is connected to the first tracking controller 218 by a line L110 for producing a first tracking actuator driving signal Sti1 based on the first tracking control signal Stc1 or the first track jump signal St1. A first linear motor driver 222 is connected to the first linear motor controller 219 by a line L112 for producing a first linear motor driving signal Smi1 based on the linear motor control signal Smc1.

The bottom head actuator 111 has a first focus actuator 223 connected to the first focus driver 220 by a signal line B100, and is driven by the first focus actuator driving signal Sfi1 so that the laser spot is properly focused on the aimed track of the disk SB. A first tracking actuator 224 is connected to the first tracking driver 221 by a signal line B102, and is driven by the first tracking actuator driving signal Sti1 so that the laser spot traces the aimed track properly. The first linear motor 225 is connected to the first linear motor driver 222 by a signal line B102, and is driven by the first linear motor driving signal Smi1 so that the first motor 225 moves in the radial direction by the predetermined distance.

Figure 3:
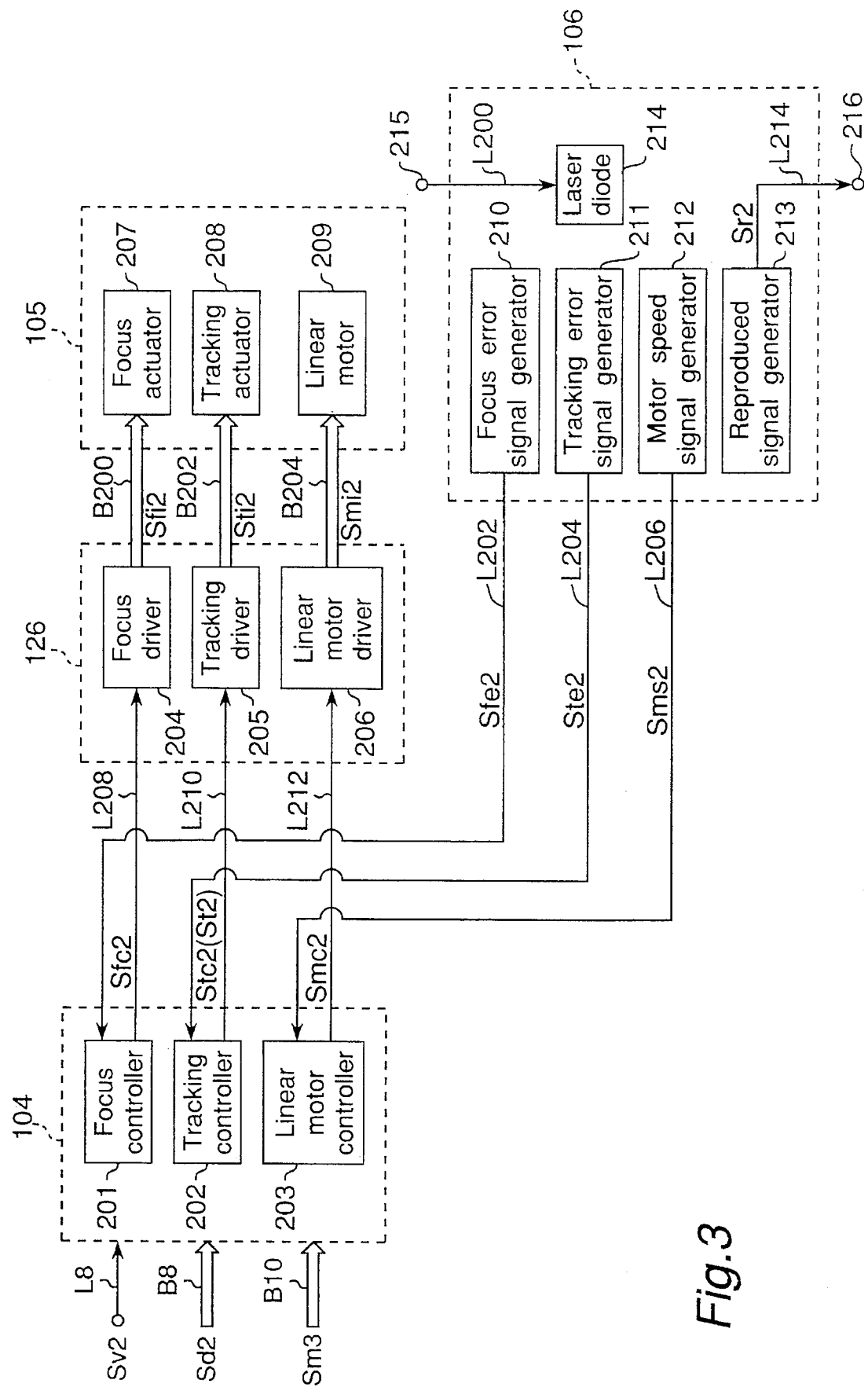
FIG. 3 is a block diagram showing the details of top head actuator of the optical recording and reproducing apparatus of FIG. 1.
Figure 4:
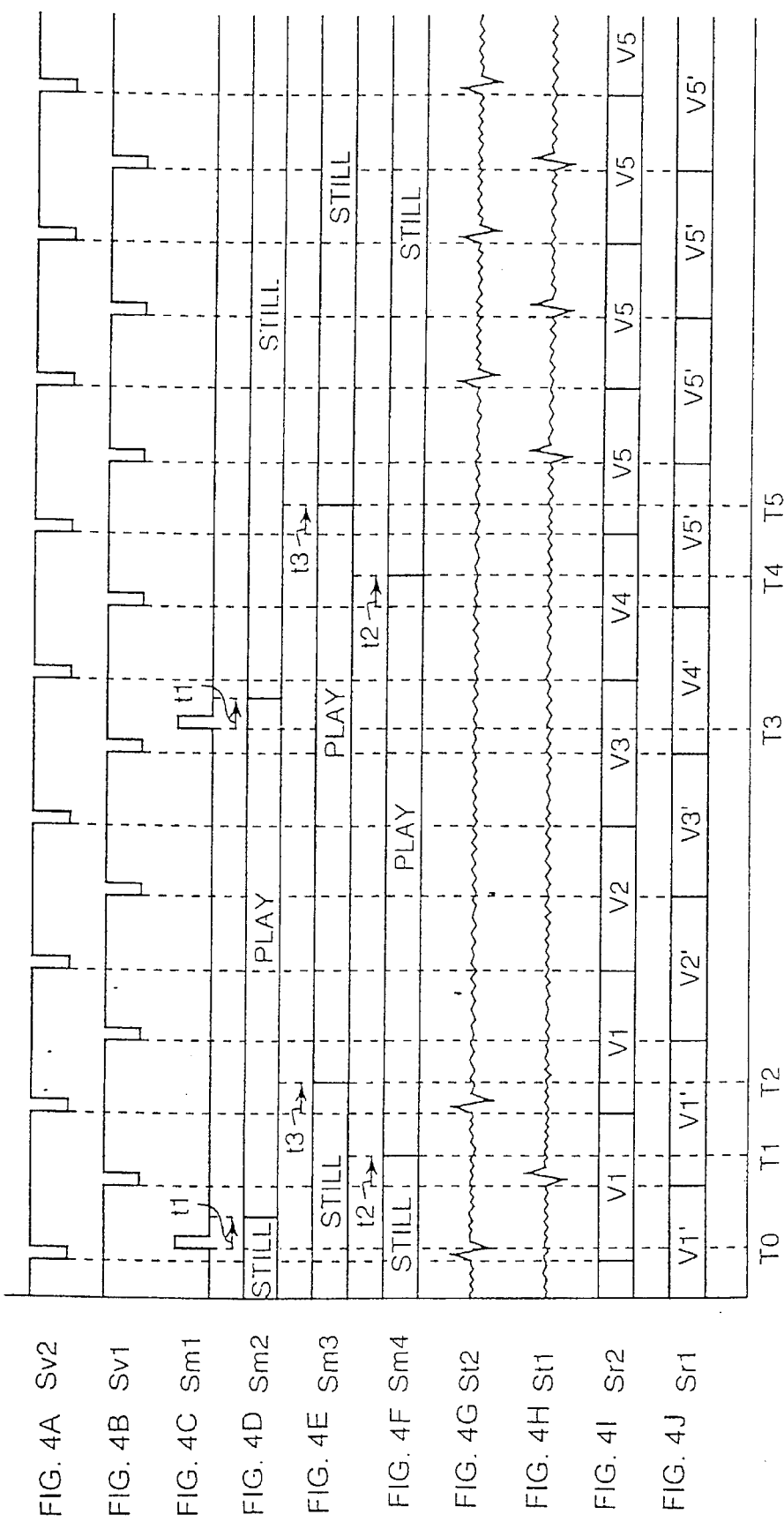
FIGS. 4A–4J is a graph-showing various signals observed in the optical recording and reproducing apparatus of FIG. 1 during the reproducing operation.

Referring to FIG. 3, the detailed construction of the top head positioning system, very similar to that of the bottom head positioning system, are shown. The top head 106 has a second laser diode 214 for impinging a laser beam upon the track on the top side SA of the disk 115. An input terminal 215 is connected to the line L1 and to the second laser diode 214 by a line L200. A second focus error signal generator 210, a second focus error signal generator, a second motor speed signal generator 212, and a second reproduced signal generator 213 are provided for generating a second focus error signal Sfe2, a second tracking error signal Ste2, a second motor speed signal Sms2 indicative of the moving speed of the top head 106, and the second reproduced signal Sr2 from the track of top side SA of the disk 115. An output terminal 216 is connected to the reproduced signal generator 213 and to the signal line B9 for outputting the second reproduced signal Sr2 therefrom.

The top head controller 104 has a second focus controller 201 connected to the second focus error signal generator 210 by a line L202 for producing a second focus control signal Sfc2 based on the second focus error signal Sfe2. A second tracking controller 202 is connected to the second tracking error signal generator 211 by a line L204 for producing a second tracking control signal Stc2 based on the second tracking error signal Ste2. The second tracking controller 202 also produces a second track jump signal St2 instead of the second tracking actuator driving signal Stc2 when the signal Sm3 instructs the still play mode and the first synchronization signal Sv2 is detected so as to jump the top head 106 in a predetermined direction to any desirable track over a predetermined number of track(s). A second linear motor controller 203 is connected to the second motor speed signal generator 212 by a line L206 for producing a second linear motor control signal Smc2 to control the moving speed of the second linear motor 209.

The top head driver 126 has a second focus driver 204 connected to the second focus controller 201 by a line L208 for producing a second focus actuator driving signal Sfi2 based on the second focus control signal Sfc2. A second tracking driver 205 is connected by the second tracking controller 202 by a line L210 for producing a second tracking actuator driving signal Sti2 based on the second tracking control signals Stc2 or the second track jump signal St2. A second linear motor driver 206 is connected to the second linear motor controller 203 by a line L212 for producing a second linear motor driving signal Smi2 based on the second linear motor control signal Smc2.

The top head actuator 105 has a second focus actuator 207 connected to the second focus driver 204 by a signal line B200, and is driven by the second focus actuator driving signal Sfi2 so that the laser spot is properly focused on the aimed track of the disk SA. A second tracking actuator 208 is connected to the second tracking driver 205 by a signal line B202, and is driven by the second tracking actuator driving signal Sti2 so that the laser spot properly trace the aimed track. The second linear motor 209 is connected to the second linear motor driver 206 by a signal line B204, and is driven by the second linear motor drivingssignal Smi2 so that the second motor 209 moves in the radial direction by the predetermined distance.

Referring to FIG. 11, the Sv2 signal generator 108 is shown. The Sv2 signal generator 108 has a latch circuit 901 connected to the signal line B8 for receiving the signal Sd2 and to an input terminal 906 which is also connected to the signal line B8 by a line for receiving a sector pulse Sp2. The latch circuit 901 latches the sector data at a timing synchronized with the sector pulse. A reference sector data source 903 storing a reference sector data S0 is provided. A comparator 902 is connected to the latch circuit 901 for receiving the latched sector data and to the reference sector data source 903 for receiving a reference sector data. The comparator 902 outputs a HIGH signal when the latched sector data is equal to the reference sector data. A vertical synchronization mark signal generator 904 is connected to the comparator 902 by a line for receiving the HIGH signal and to the input terminal 906 for receiving the sector pulse Sp2. The generator 904 produces a low level signal as the signal Sv2 on receipt of the HIGH signal from the comparator 902.

Referring to FIGS. 12A–12D, signals produced by the Sv2 signal generator 108 is shown. One of semi-track is comprised of five sectors S0 to S4. From each position where the sector changes, the sector pulse signal SP2 is outputted by the ID signal generator 107. The sector data signals Sd2 for the recognition of the sectors S0 to S4 also outputted by the ID signal generator 107. As described previous, the comparison result signal Sc2 having a high level is outputted by the comparator 902 when the sector data signal Sd2 is equal to the reference sector data S0. The signal Sv2 is produced when the signal Sc2 enters the generator 904.

It is to be noted that the Sv1 signal generator 114 has a construction very similar to that of the Sv2 signal generator, therefore its operation is similar. The V-mark signal generators 108 and 114 may be configured to simply detect the vertical synchronization mark signal during optical disk reproduction, compare the reproduced sector address with the predetermined data value S0, and output the vertical synchronization mark detection signals Sv1 and Sv2 if the reproduced sector address and the predetermined data value S0 are the same. In addition, both top and bottom sides SA and SB of the optical disk 115 used by the optical recording and reproducing apparatus 100 are formatted as shown in FIGS. 13 and 14, and a single double-sided disk is manufactured by bonding these identically formatted top and bottom side members 601 and 602 together.

Referring to FIGS. 15A–15F, the V-mark detection according to the optical recording and reproducing apparatus is described. The V-mark detection signals Sv1 and Sv2 are generated based on the sector addresses. The sector pulse Sp1 and Sp2 and sector address information Sd1 and Sd2 and are obtained by the both pick-up heads 106 and 112 by reproducing the ID unit (1902) from the bottom side of the optical disk 115, and the ID signal generators 107 and 113 demodulates the ID unit signal from the reproduced signals from the disk 115 by the heads 106 and 112.

The V-mark detection circuit 114 (Sv1 signal generator) then compares the sector address information with the predetermined sector information (S0 in this example) at the input timing of the sector pulse Sp1, and outputs the vertical synchronization mark detection signal Sv1 when the sector address information Sd1 is S0.

Similarly, the top head 106 reproduces the ID unit 1902 from the top side of the optical disk 115, and the ID signal generator 107 demodulates the reproduced ID unit signal Sd2 to output the sector pulse Sp2 and sector address information (Sd2) for the top side SA.

Figure 15:
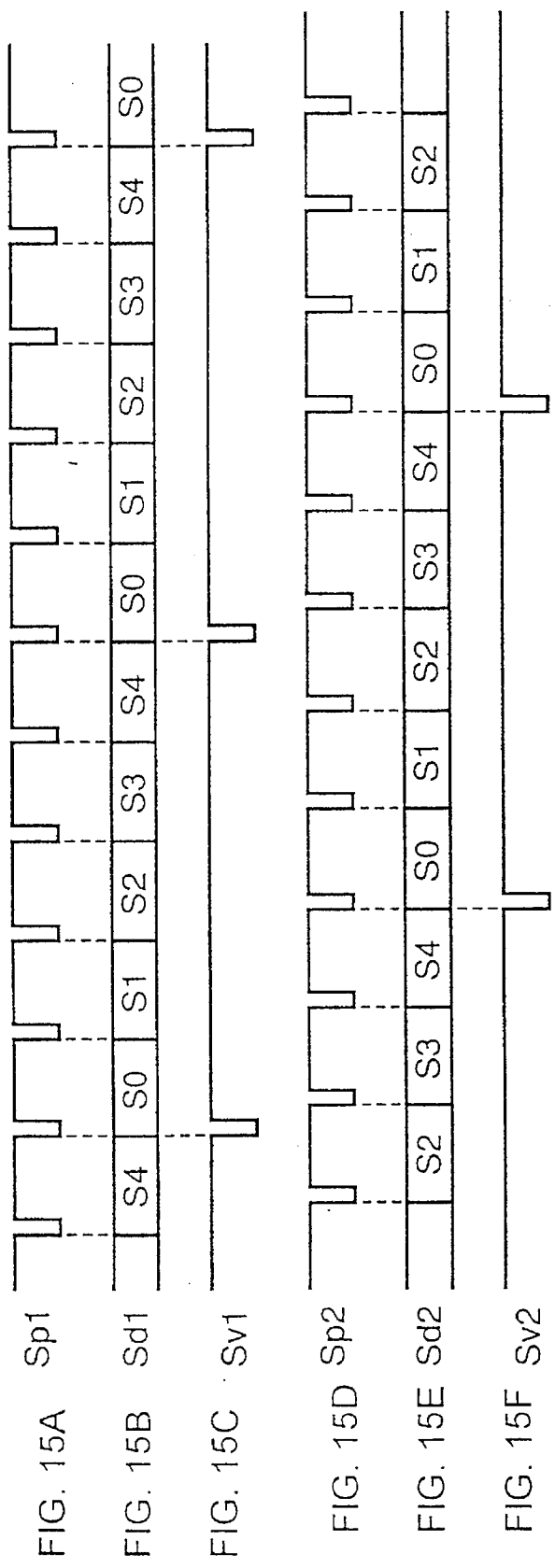
FIGS. 15A–15F is a graph showing signals in assistance of explaining the timing at which the rotation position detection signal is produced from the optical disk of FIG. 14.

The V-mark detection circuit (Sv2 signal generator) 108 then compares the sector address information with the predetermined sector information (S0 in this example) at the input timing of the sector pulse Sp2 shown in FIG. 15, and outputs the vertical synchronization mark detection signal as the Sv2 signal when the sector address information is S0.

Figure 5:
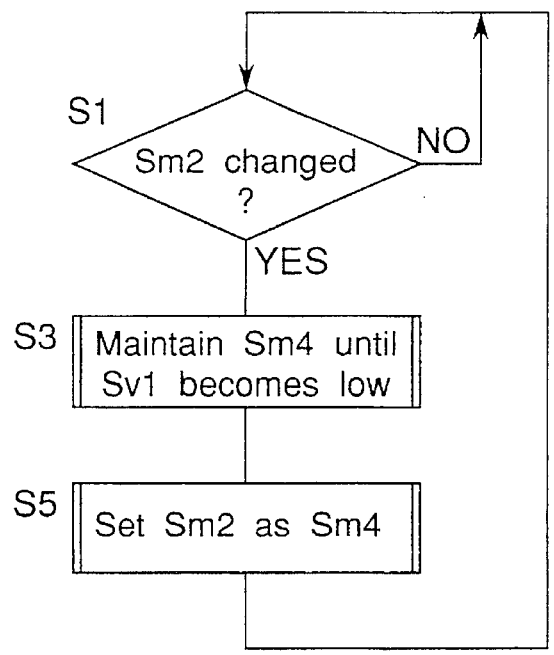
FIG. 5 is a flow chart showing the bottom head mode determining operation by the optical recording and reproducing apparatus of FIG. 1.

Referring to FIG. 5, a flow chart showing the operation of the top head mode determiner 109 which produces the bottom head operation signal Sm4 is shown.

At step S1, it is judged whether the operation mode signal Sm2 changed from "STILL" to "PLAY" or from "PLAY" to "STILL", or not. When it is "Yes", the procedure advances to step S30 However, it is "NO", the procedure returns the step S1 and repeats the judgment thereat until the operation mode signal Sm2 changes.

At step S3, the current value of the top head operation signal Sm3 is maintained until the first vertical synchronization mark signal Sv1 becomes low level.

At step S5, the current value of the operation mode signal Sm2 is set to the bottom head operation mode signal Sm4. Then, the procedure returns to the step S1.

Figure 6:
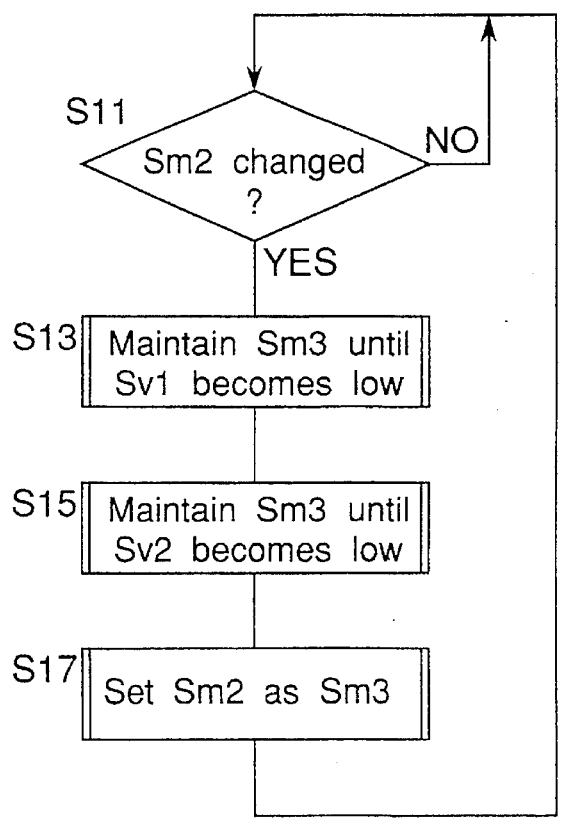
FIG. 6 is a flow chart showing the top head mode determining operation by the optical recording and reproducing apparatus of FIG. 1.

Referring to FIG. 6, a flow chart showing the operation of the top head mode determiner 103 which produces the top head operation signal Sm3 is shown.

At step S11, it is judged whether the operation mode signal Sm2 changed from "STILL" to "PLAY" or from "PLAY" to "STILL", or not. When it is "Yes", the procedure advances to step S3. However, it is "NO", the procedure returns the step S11 and repeats the judgment until the operation mode signal Sm2 changes.

At step S13, the current value of the top head operation signal Sm3 is maintained until the first vertical synchronization signal Sv1 changes to a low level.

At step S15, it is current value of the top head operation signal Sm3 is maintained until the second vertical synchronization mark signal Sv2 changes to a low level.

At step S17, the current value of the operation mode signal Sm2 is set to the bottom head operation mode signal Sm3. Then, the procedure returns to the step S11.

With reference to FIGS. 4A–4J, the reproducing operation of the optical recording and reproducing apparatus 100 is described. The mode selection signal Sm1 having a pulse wave form is output at the timing when the command key information is input to the mode set panel 101. Note that it is assumed here that the still OFF command Sm1 (reproduction mode command) is input at time T0, and the still ON command Sm1 is input to the mode set panel 101 at time T3.

The mode set panel 101 outputs the mode setting input data corresponding to the key information to the mode determiner 102 when the command key is entered to the mode set means 101. Based on the current operating mode and the mode setting input data input from the mode set panel 101, the mode determiner 102 sets the operation mode after processing time t1 from command key input points T0 and T3, and outputs the operating mode signal Sm2 to the top head mode determiner 103 and the bottom head mode determiner 109.

The bottom head mode determiner 109 sends the still OFF command Sm4 to the bottom head controller 110 at time T1, which is delayed time t2 from the point the first vertical synchronization mark detection signal Sv1 is input for the top time after the operating mode Sm2 changes from the still ON mode to the still OFF mode (reproduction mode). The still ON command is similarly sent to the bottom head controller 110 at time T4, which is delayed time t2 from the point the first vertical synchronization mark detection signal Sv1 is input for the top time after the operating mode data Sm2 changes from the still OFF mode (reproduction mode) to the still ON mode.

The top head mode determiner 103 sends the still OFF command Sm3 to the top head controller 104 at time T2, which is delayed time t3 from the point the second vertical synchronization mark detection signal Sv2 is input after the first vertical synchronization mark detection signal Sv1 is input for the top time after the operating mode data Sm2 changes from the still ON mode to the still OFF mode (reproduction mode). The still ON command is similarly sent to the top head controller 104 at time TS, which is delayed time t3 from the point the second synchronization mark detection signal Sv2 is input after the vertical synchronization mark detection signal Sv1 is input for the top time after the operating mode data Sm2 changes from the still OFF mode (reproduction mode) to the still ON mode.

Thus, by using vertical synchronization mark detection signals Sv1 and Sv2, which is a reference signal for the recording and reproducing timing of the audio and video signals, to generate the setting timing of the operating mode, and setting the operating mode switching timing of the top and bottom head actuators 105 and 111 according to the signal recording position on the disk medium no matter what timing the key information data is input to the mode set panel 101 or whether the positions of the vertical synchronization marks Sv1 and Sv2 preformatted to the top and bottom sides SA and SB of the disk medium are offset, the predetermined correlation between the track addresses that should be scanned by the top and bottom heads 106 and 112 can be maintained, and a stable recording and reproducing operation can be achieved.

In the first embodiment of the invention described above, the mode setting input panel 101 is described as a keyboard device coding the ON/OFF information of the keys using a key scan operation, and outputting the coded data as the mode setting input data, but the mode set panel 101 may also be a remote control device from which the mode information is output as the mode setting input data achieving the same effect.

As described hereinabove, in an optical disk recording and reproducing apparatus according to the first embodiment of the invention whereby the audio and video signals for one frame are divided into top and bottom audio and video signal components, the top audio and video signal component is recorded to the predetermined track of the top side of the disk referenced to vertical synchronization marks preformatted to the top side of the disk, and the bottom audio and video signal component is recorded to the predetermined track of the bottom side of the disk referenced to vertical synchronization marks preformatted to the bottom side of the disk, even if mode information for switching the operating mode is input from an external source at any given timing, a stable recording and reproducing operation can be achieved by generating the setting timing of the head actuator operating mode based on the vertical synchronization mark detection signals of the top and bottom heads without losing the predetermined correlation between the track addresses to be scanned by each head, and therefore even if there is an offset in the alignment of the bonded optical disk media.

With reference to FIGS. 10A–10J, the recording operation of the optical recording and reproducing apparatus 100 is described. The operation mode selection signal Sm1 is output at the timing when the command key information is input to the mode set panel 101. Note that it is assumed here that the still OFF command Sm1 which is recording mode command (referred to as "REC PLAY" in FIGS. 10A–10J) is input at time T0, and the still ON command Sm1 is input to the mode set panel 101 at time T3.

The mode set panel 101 outputs the mode setting input data corresponding to the key information to the mode determiner 102 when the command key is entered to the mode set means 101. Based on the current operating mode and the mode setting input data input from the mode set panel 101, the mode determiner 102 sets the operation mode after processing time t1 from command key input points T0 and T3, and outputs the operating mode signal Sm2 to the top head mode determiner 103 and the bottom head mode determiner 109.

The bottom head mode determiner 109 sends the still OFF command Sm4 to the bottom head controller 110 at time T11, which is delayed time t2 from the point the first vertical synchronization mark detection signal Sv1 is input for the top time after the operating mode Sm2 changes from the still ON mode to the still OFF mode (recording mode). The still ON command is similarly sent to the bottom head controller 110 at time T4, which is delayed time t2 from the point the first vertical synchronization mark detection signal Sv1 is input for the-top time after the operating mode data Sm2 changes from the still OFF mode (recording ode) to the still ON mode.

The top head mode determiner 103 sends the still OFF command Sm3 to the top head controller 104 at time T12, which is delayed time t3 from the point the second vertical synchronization mark detection signal Sv2 is input after the first vertical synchronization mark detection signal Sv1 is input for the top time after the operating mode data Sm2 changes from the still ON mode to the still OFF mode (recording mode). The still ON command is similarly sent to the top head controller 104 at time T15, which is delayed time t3 from the point the second synchronization mark detection signal Sv2 is input after the vertical synchronization mark detection signal Sv1 is input for the top time after the operating mode data Sm2 changes from the still OFF mode (recording mode) to the still ON mode.

Second Embodiment

Figure 16:
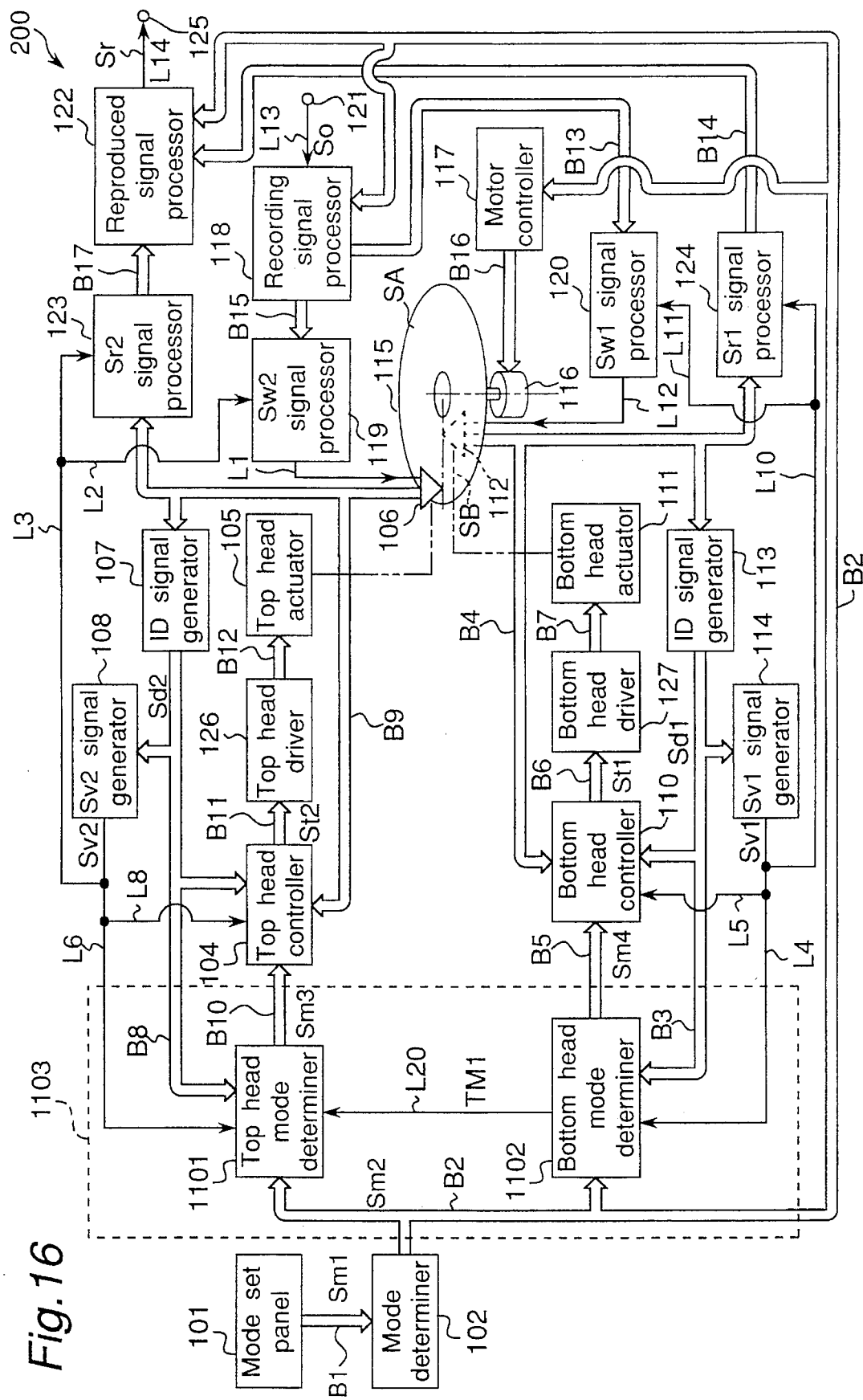
FIG. 16 is a block diagram showing an optical recording and reproducing apparatus according to a second embodiment of the present invention.

Referring to FIG. 16, an optical recording and reproducing apparatus 200 according to a second embodiment of the present invention is shown. In this embodiment, the optical head operation mode determiner 128 of FIG. 1 is replaced by an optical head operation mode determiner 1103 having the top head mode determiner 1101 and a bottom head mode determiner 1102. In this embodiment, the top head mode determiner 1101 is not connected to the line L4 for directly receiving the Sv1 signal from the Sv1 signal generator, but is connected to the bottom head mode determiner by a line L20 for receiving a V-mark detection signal TM1 which the bottom head mode determiner 1102 produces based on the Sv1 signal.

Referring to FIGS. 17A–17L, the operation of the optical recording and reproducing apparatus 200 is described. Thus, by using a-vertical synchronization mark detection signal, which is a reference signal for the recording and reproducing timing of the audio and video signals, to generate the setting timing of the operating mode, the audio and video signals will be reproduced using the predetermined combination of the components Vn and Vn' into which the audio and video signals of the one frame were divided, and a stable reproduction image can thus be obtained, no matter what timing the key information data is input to the mode setting input means.

The V-mark detection timing signal output from the bottom head operating mode determiner in this embodiment is output at the input timing of the roating position detection signal signal Sv1 (VMARK1), which is input for the top time after the operating mode data input from the mode setting means 102 changes. Note that the same effect can be obtained, however, using a command data output timing signal output from the bottom head operating mode determiner 1102 at the output timing of the command data to the bottom head controller 110.

As in the first embodiment described above, in an optical disk recording and reproducing apparatus according to the bottom embodiment of the invention whereby the audio and video signals for one frame are divided into top and bottom audio and video signal components, the top audio and video signal component is recorded to the predetermined track of the top side of the disk referenced to vertical synchronization marks preformatted to the top side of the disk, and the bottom audio and video signal component is recorded to the predetermined track of the bottom side of the disk referenced to vertical synchronization marks preformatted to the bottom side of the disk, even if mode information for switching the operating mode is input from an external source at any given timing, a stable recording and reproducing operation can be achieved by generating the setting timing of the head actuator operating mode based on the vertical synchronization mark detection signals of the top and bottom heads without losing the predetermined correlation between the track addresses to be scanned by each head, and therefore even if there is an offset in the alignment of the bonded optical disk media.

Referring to FIG. 18, a flow chart showing the operation of the bottom head mode determiner 1102 is shown.

At step S21, it is judged whether the operation mode signal Sm2 changed or not. When it is "Yes", the procedure advances to step S23. However, it is "NO", the procedure returns the step S21.

At step S23, the current value of the bottom head operation signal Sm4 is maintained until the first vertical synchronization mark signal Sv1 becomes low level.

At step S25, the V-mark detection signal TM1 is produced when the signal Sv1 is detected.

At step S27, the current value of the operation mode signal Sm2 is set to the bottom head operation mode signal Sm4. Then, the procedure returns to the step S1.

Referring to FIG. 19, a flow chart showing the operation of the top head mode determiner 1101 is shown.

At step S31, it is judged whether the operation mode signal Sm2 changed or not. When it is "Yes", the procedure advances to step S33. However, it is "NO", the procedure returns the step S31.

At step S33, the current value of the top head operation signal Sm3 is maintained until the signal TM becomes a high level.

At step S35, the signal Sm3 is maintained until the signal Sv2 changes to a low level.

At step S35, the current value of the operation mode signal Sm2 is set to the bottom head operation mode signal Sm3. Then, the procedure returns to the step S31.

Third Embodiment

Figure 20:
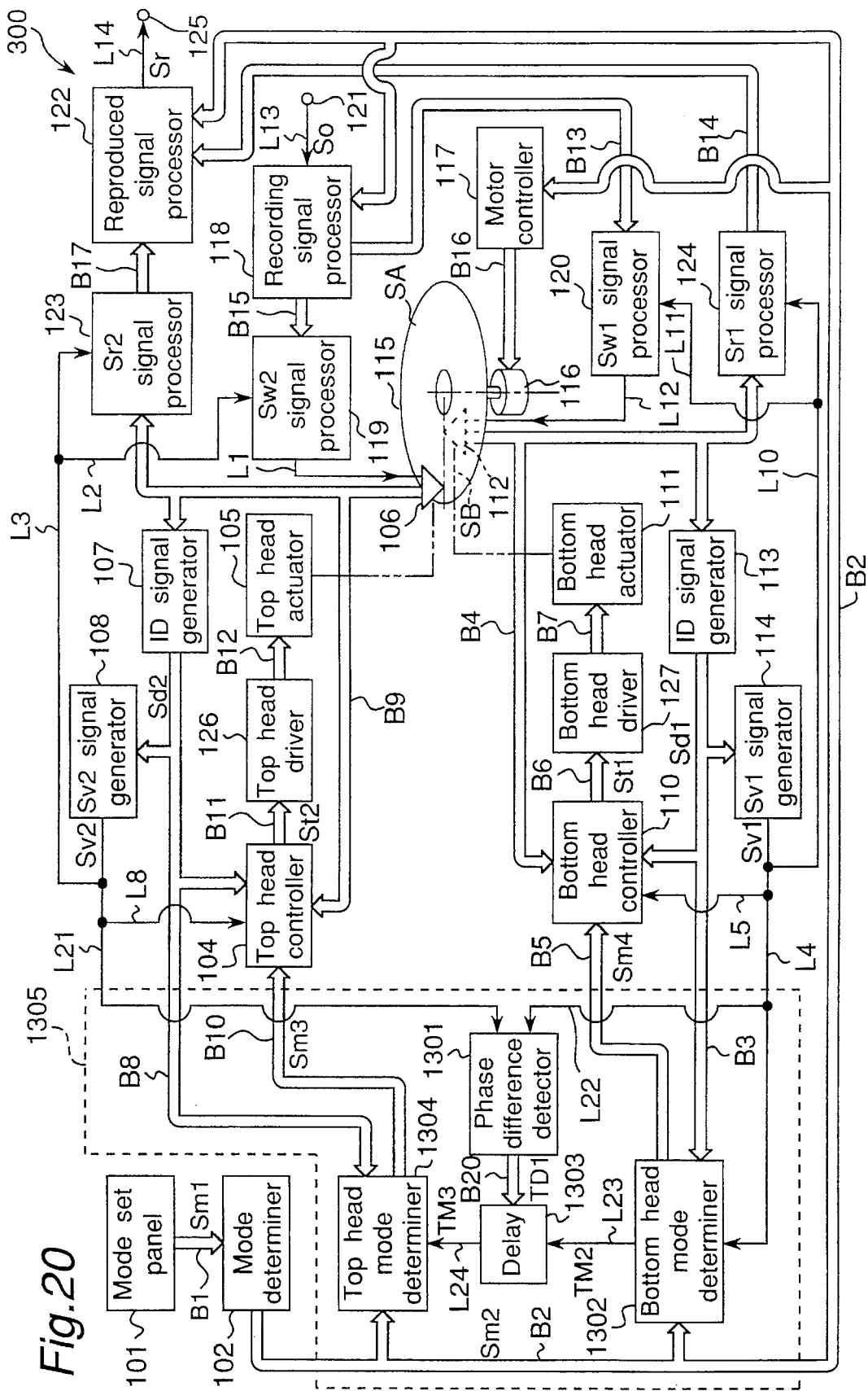
FIG. 20 is a block diagram showing an optical recording and reproducing apparatus according to a third embodiment of the present invention.
Figure 21:
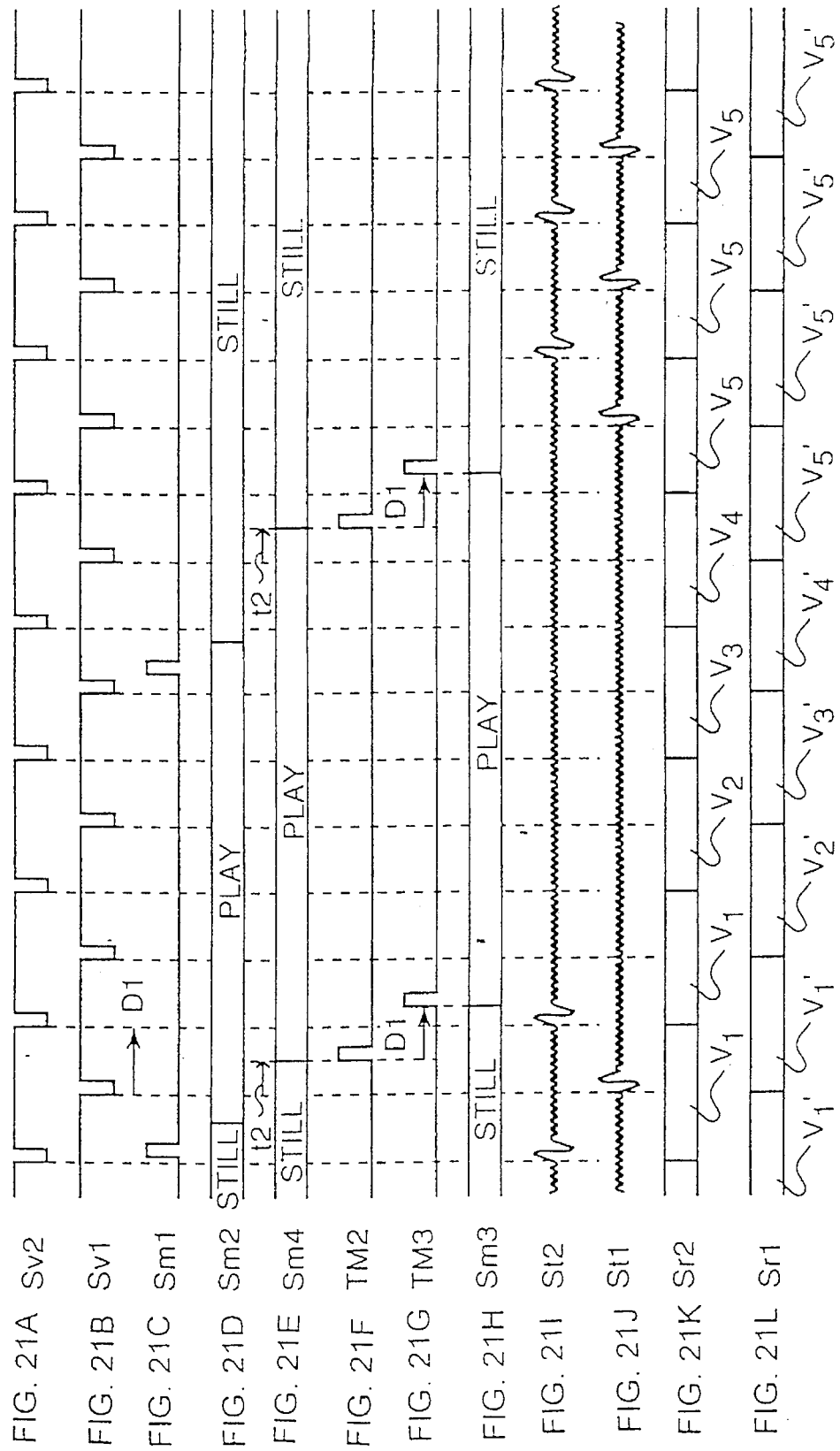
FIGS. 21A–21L is a graph showing various signals observed in the optical recording and reproducing apparatus of FIG. 20 during the reproducing operation.

Referring to FIG. 20, an optical recording and reproducing apparatus 300 according to a third embodiment of the present invention is shown. In this embodiment, the optical head operation mode determiner 128 of FIG. 16 is replaced by an optical head operation mode determiner 1305 having the top head mode determiner 1304 and a bottom head mode determiner 1303. A phase difference detector 1301 and a delay circuit 1303 connected to each other by a signal line B20 are additionally provided. The phase difference detector 1301 is connected to the Sv2 signal generator 108 by a line L21 and to the line L4 by a line L22, and produces a phase difference signal TD1 based on the signals Sv1 and Sv2. The delay circuit 1303 is further connected to the bottom head mode determiner 1302 by a line L23 for receiving the signal TM2. The delay circuit 1303 produces a signal TM3 based on the signals TD1 and TM2. The top head mode determiner 1304 is connected to the delay circuit 1303, and produces the operation mode signal Sm3 based on the signal TM3 and Sm2.

Referring to FIGS. 21A–21L, the operation of the optical recording and reproducing apparatus 300 is described.

In this third embodiment of the invention, if the output time difference of the vertical synchronization mark detection signal Sv1 (VMARK1) and the rotation position detection signal Sv2 (VMARK2) are once detected by the phase difference detection circuit 701 for the current optical disk medium, it is possible to use only the the signal VMARK1 for subsequent processing, and processing can be simplified.

As in the top embodiment described above, in an optical disk recording and reproducing apparatus according to the third embodiment of the invention whereby the audio and video signals for one frame are divided into top and bottom audio and video signal components, the top audio and video signal component is recorded to the predetermined track of the top side of the disk referenced to vertical synchronization marks preformatted to the top side of the disk, and the bottom audio and video signal component is recorded to the predetermined track of the bottom side of the disk referenced to vertical synchronization marks preformatted to the bottom side of the disk, even if mode information for switching the operating mode is input from an external source at any given timing, a stable recording and reproducing operation can be achieved by generating the setting timing of the head actuator operating mode based on the vertical synchronization mark detection signals of the top and bottom heads without losing the predetermined correlation between the track addresses to be scanned by each head, and therefore even if there is an offset in the alignment of the bonded optical disk media.

Figure 22:
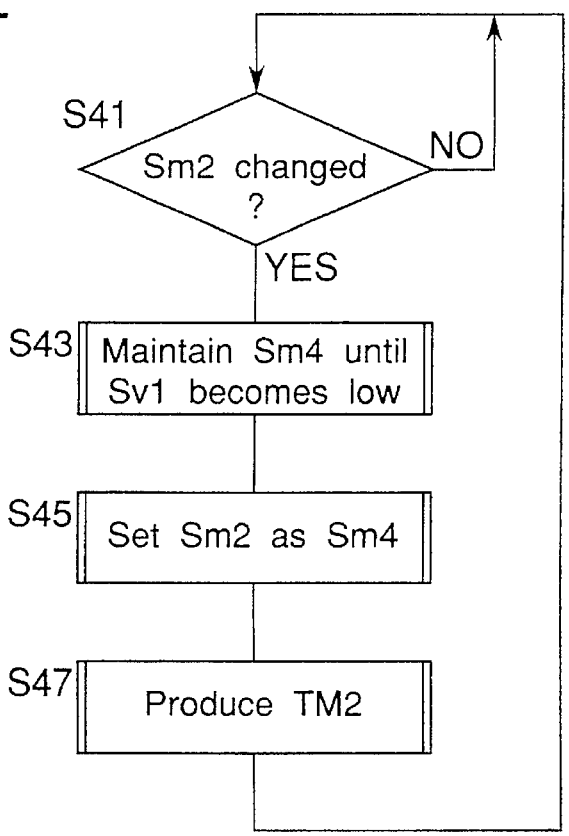
FIG. 22 is a flow chart showing the bottom head mode determining operation by the optical recording and reproducing apparatus of FIG. 20.

Referring to FIG. 22, a flow chart showing the operation of the bottom head mode determiner 1302 is shown.

At step S41, it is judged whether the operation mode signal Sm2 changed or not. When it is "Yes", the procedure advances to step S43. However, it is "NO", the procedure returns the step S41.

At step S43, the current value of the bottom head operation signal Sm4 is maintained until the first vertical synchronization mark signal Sv1 becomes low level.

At step S45, the current value of the operation mode signal Sm2 is set to the bottom head operation mode signal Sm4.

At step S47, the signal TM2 is produced. Then, the operation returns to step

Figure 23:
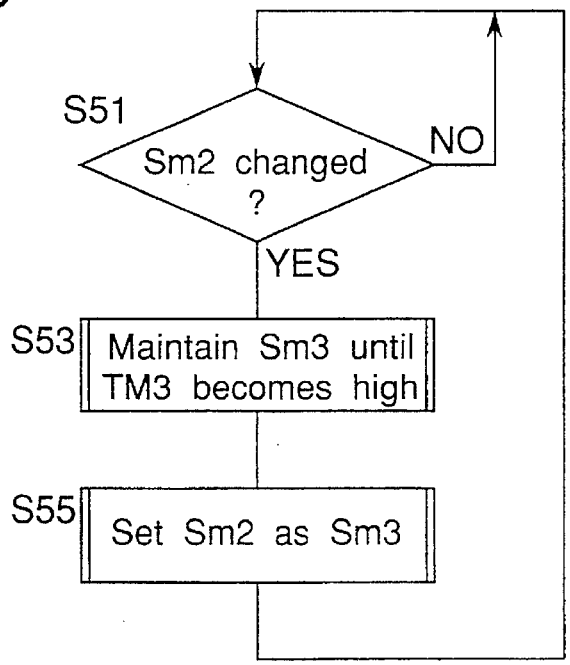
FIG. 23 is a flow chart showing the top head mode determining operation by the optical recording and reproducing apparatus of FIG. 20.

Referring to FIG. 23, a flow chart showing the operation of the top head mode determiner 1304 is shown.

At step S51, it is judged whether the operation mode signal Sm2 changed or not. When it is "Yes", the procedure advances to step S53. However, it is "NO", the procedure returns the step S51.

At step S53, the current value of the signal Sm3 is maintained until the signal TM3 becomes a high level.

At step S55, the current value of the operation mode signal Sm2 is set to the bottom head operation mode signal Sm3. Then, the procedure returns to the step S51.

Fourth Embodiment

Figure 24:
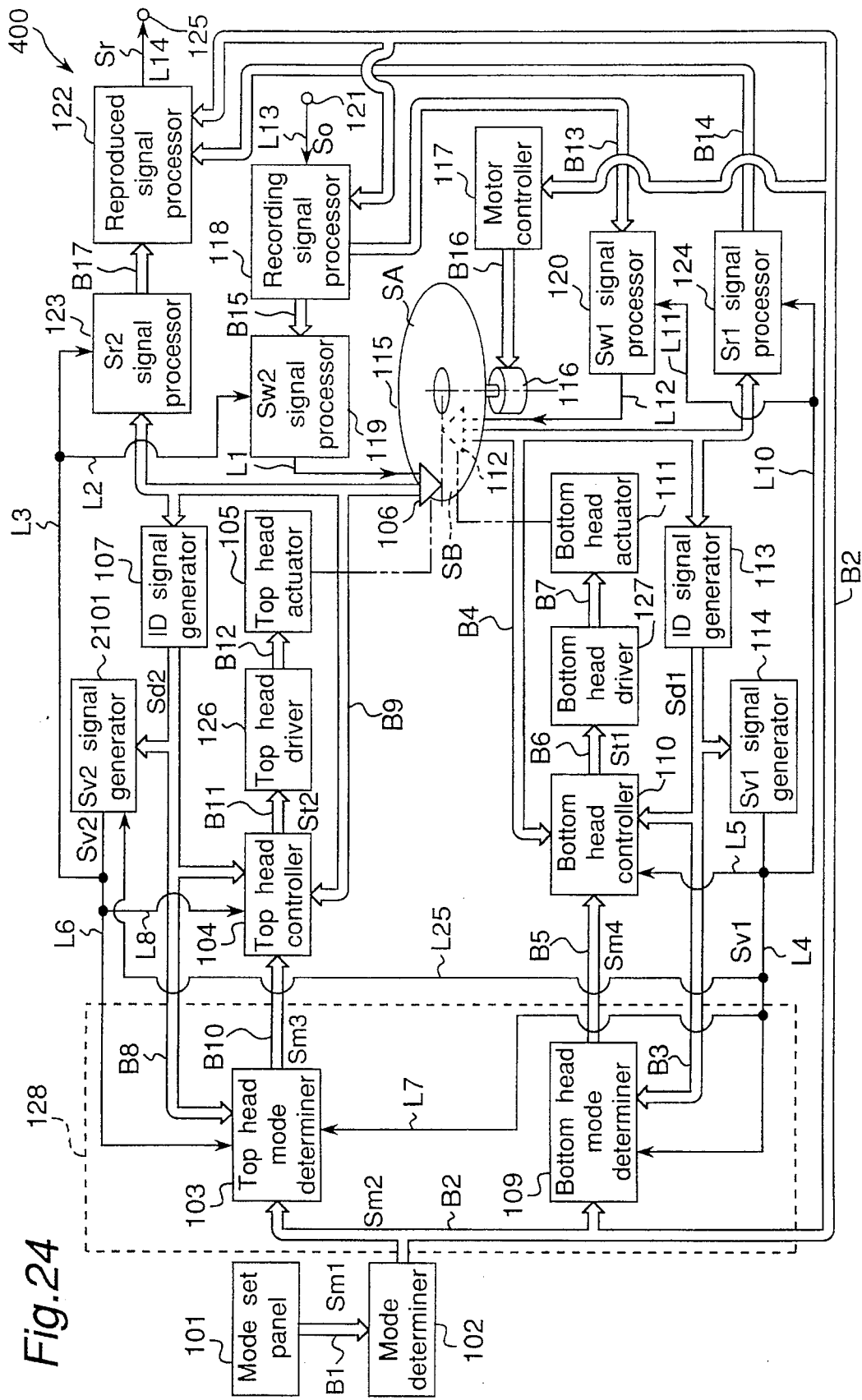
FIG. 24 is a block diagram showing an optical recording and reproducing apparatus according to a fourth embodiment of the present invention.

Referring to FIG. 24, an optical recording and reproducing apparatus 400 according to a fourth embodiment of the present invention is shown. In this embodiment, the Sv2 signal generator 108 of FIG. 1 is replaced by another SV2 signal generator 2101 which is connected to the line L4 by a line L25.

Referring to FIG. 25, the details of Sv2 signal generator 2101 is shown. The Sv2 signal generator 2101 has a first latch circuit 2201 which latches the sector data Sd2 at the leading edge of the signal Sv1. A calculator 2202 is connected to the first latch 2201 for calculating to output a reference sector data Sref for the generation of the signal Sv2. In this embodiment, a sector data which is one sector after the sector data outputted from the first latch circuit 2201 is calculated. A reference sector data storage 2203 is connected to the calculator 2202 for storing the calculation result output Sref therefrom. A second latch circuit 2204 is connected the signal line B8 and an input terminal 2301 for receiving the sector data Sd2 and sector pulse Sp2. The second latch circuit 2204 latches the sector data Sd2 at the trailing edge of the sector pulse Sp2. A comparator is connected to the reference sector data storage 2203, the second latch circuit 2204, and the input terminal 2301, as shown in FIG. 25. The comparator 2205 compares the output data from the second latch circuit 2204 with the reference sector data Sref stored in the storage 2203, and produces a comparison result signal Sc1 which logical level becomes HIGH when those two data are the same. A vertical synchronization mark signal generator 2206 is connected to the comparator 2205 and the input terminal 2301 by lines. The generator 2206 produces the V-mark signal Sv2 having a pulse width Tv. The logical level of the signal Sv becomes LOW when the comparison result signal from the comparator 2205 is HIGH.

Referring to FIGS. 26A–26F, signals observed in the Sv2 signal generator 2101 are shown.

Referring to FIGS. 27A–27N, various signals observed in the optical recording and reproducing apparatus 400 are shown.

Thus, the rotation position detection signals VMARK1 and VMARK2 are used as the basic timing signals for audio and video signal processing, and provide a reference for the recording position of the single frame audio and video signals on the top and bottom sides of the optical disk medium 115.

The rotation position detection signal VMARK1 output from the V-mark detection circuit 1102 is input to the top head operating mode setting means 103 and to the bottom head operating mode setting means 109. The rotation position detection signal VMARK2 output from the V-mark detection circuit 1101 is similarly input to the top head operating mode setting means.

The bottom head operating mode determiner 109 then outputs the operating mode setting command for the bottom head controller 110 based on the operating mode data output from the mode setting means and the rotation position detection signal VMARK1 output from the V-mark detection circuit.

The top head operating mode determiner 103 outputs the operating mode setting command to the top head controller 104 corresponding to the operating mode data output from the mode determiner 102 based on the operating mode data output from the mode determiner 102, the rotation position detection signal VMARK2 output from the V-mark detection circuit 2101, and the rotation position detection signal VMARK1 output from the V-mark detection circuit 2102.

Thus, by using a vertical synchronization mark detection signal, which is a reference signal for the recording and reproducing timing of the audio and video signals, to generate the setting timing of the operating mode, and setting the operating mode switching timing of the top and bottom head actuators according to the signal recording position on the disk medium no matter what timing the key information data is input to the mode setting input means or whether the positions of the vertical synchronization marks preformatted to the top and bottom sides of the disk medium are offset, the predetermined correlation between the track addresses that should be scanned by the top and bottom heads can be maintained, and a stable recording and reproducing operation can be achieved.

Furthermore, regardless of variations between the alignment of the top and bottom sides of the optical disk medium 115, the phase relationship of the rotation position detection signals VMARK1 and VMARK2, which are used for timing audio and video signal processing, will remain within the period T1. It is therefore possible to hold the timing variation of signal processing and the offset between the mode setting timing of the top and bottom heads within a predetermined range, timing control of signal processing can be simplified, and the overall circuit scale can therefore be reduced.

As described hereinabove, in an optical disk recording and reproducing apparatus according to the fourth embodiment of the invention whereby the audio and video signals for one frame are divided into top and bottom audio and video signal components, the top audio and video signal component is recorded to the predetermined track of the top side of the disk referenced to vertical synchronization marks preformatted to the top side of the disk, and the bottom audio and video signal component is recorded to the predetermined track of the bottom side of the disk referenced to vertical synchronization marks preformatted to the bottom side of the disk, even if mode information for switching the operating mode is input from an external source at any given timing, a stable recording and reproducing operation can be achieved by generating the setting timing of the head actuator operating mode based on the vertical synchronization mark detection signals of the top and bottom heads without losing the predetermined correlation between the track addresses to be scanned by each head.

Fifth Embodiment

Figure 28:
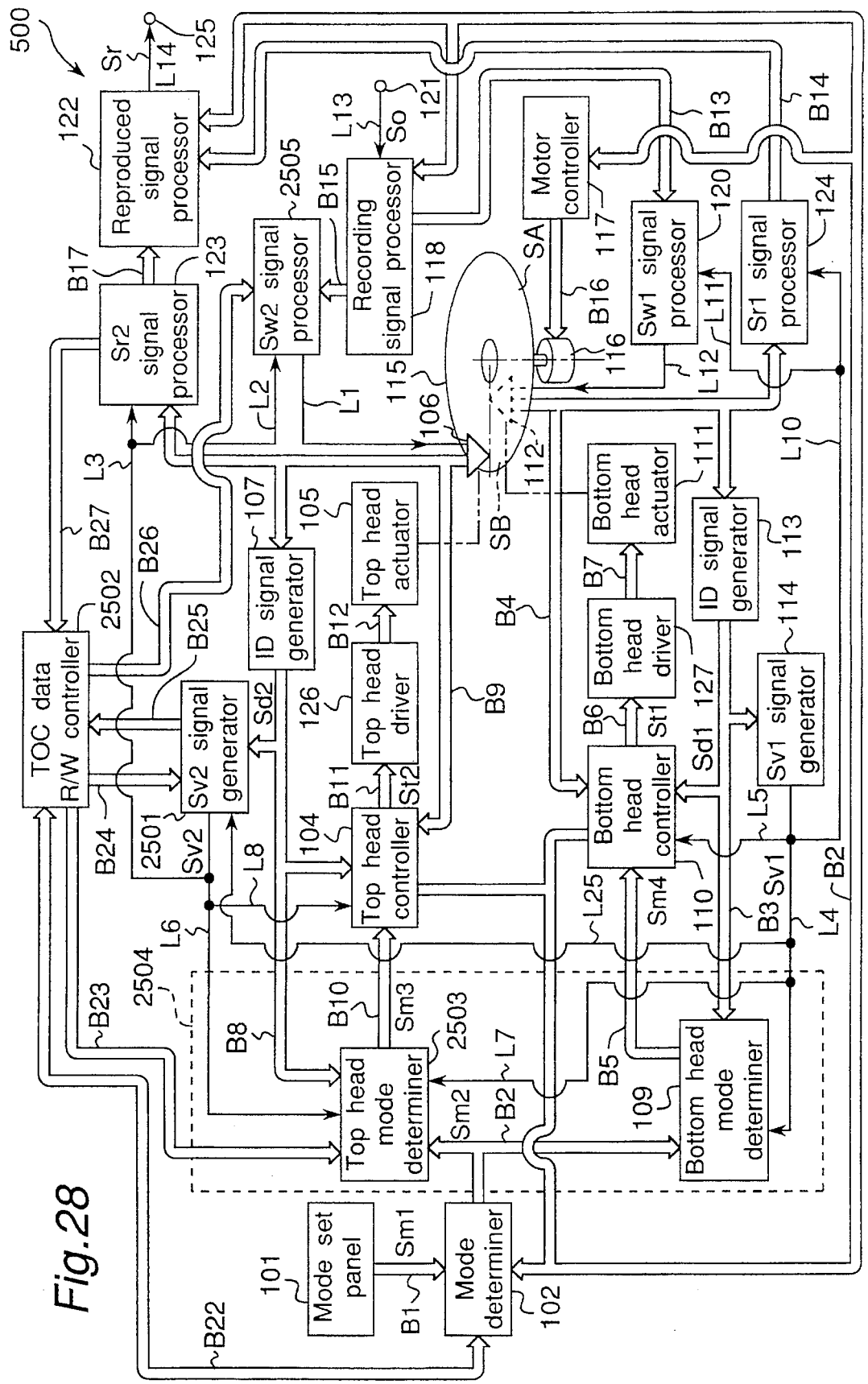
FIG. 28 is a block diagram showing an optical recording and reproducing apparatus according to a fifth embodiment of the present invention.

Referring to FIG. 28, an optical recording and reproducing apparatus 500 according to a fifth embodiment of the present invention is shown. In this embodiment, the Sv2 signal generator 108 and the Sw2 signal processor 119 of FIG. 1 are replaced by another Sv2 signal generator 2501 and another Sw2 signal processor 2505, respectively. The optical head mode determiner 128 of FIG. 1 is also replaced by another determiner 2504 having a top head mode determiner 2503 and the bottom head mode determiner 109. A TOC data R/W controller 2502 for reading or writing the information from or to the TOC portion 1908 of the disk 115 is provided. These members are connected to each other by signal lines B22, B23, B24, B25, and B27, and a line L25, as specifically shown in FIG. 28.

Figure 30:
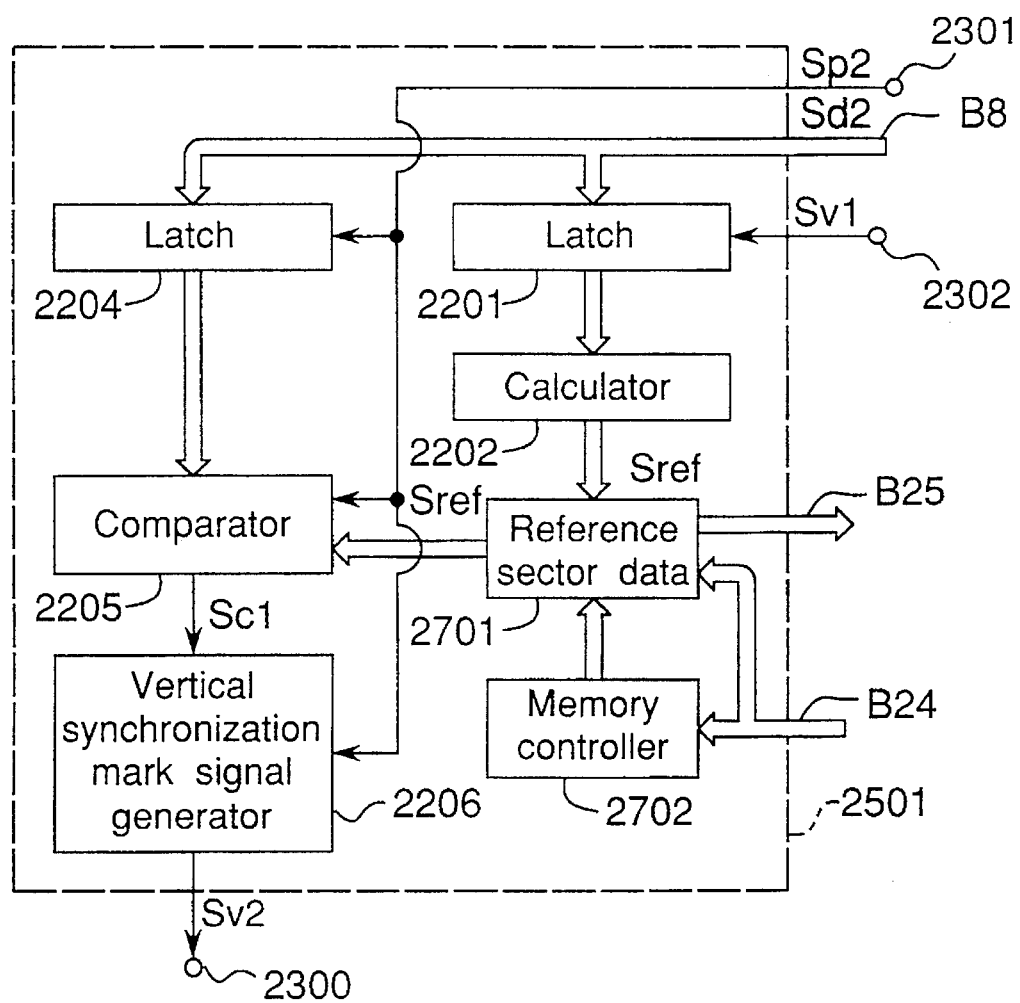
FIG. 30 is a block diagram showing the details of the Sv2 signal generator of the optical recording and reproducing apparatus of FIG. 29.
Figure 31:
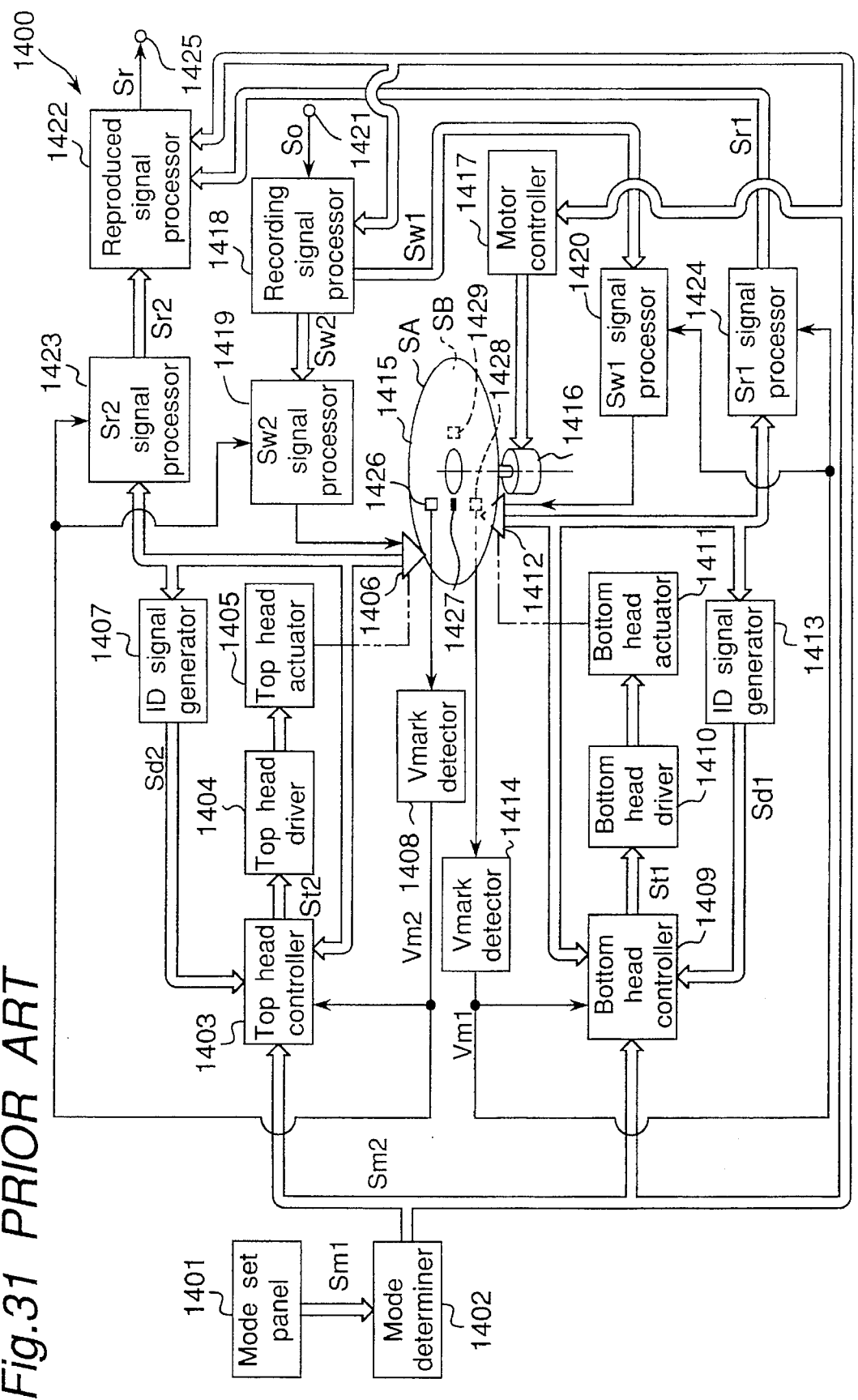
FIG. 31 is a block diagram showing a conventional optical recording and reproducing apparatus.
Figure 32:
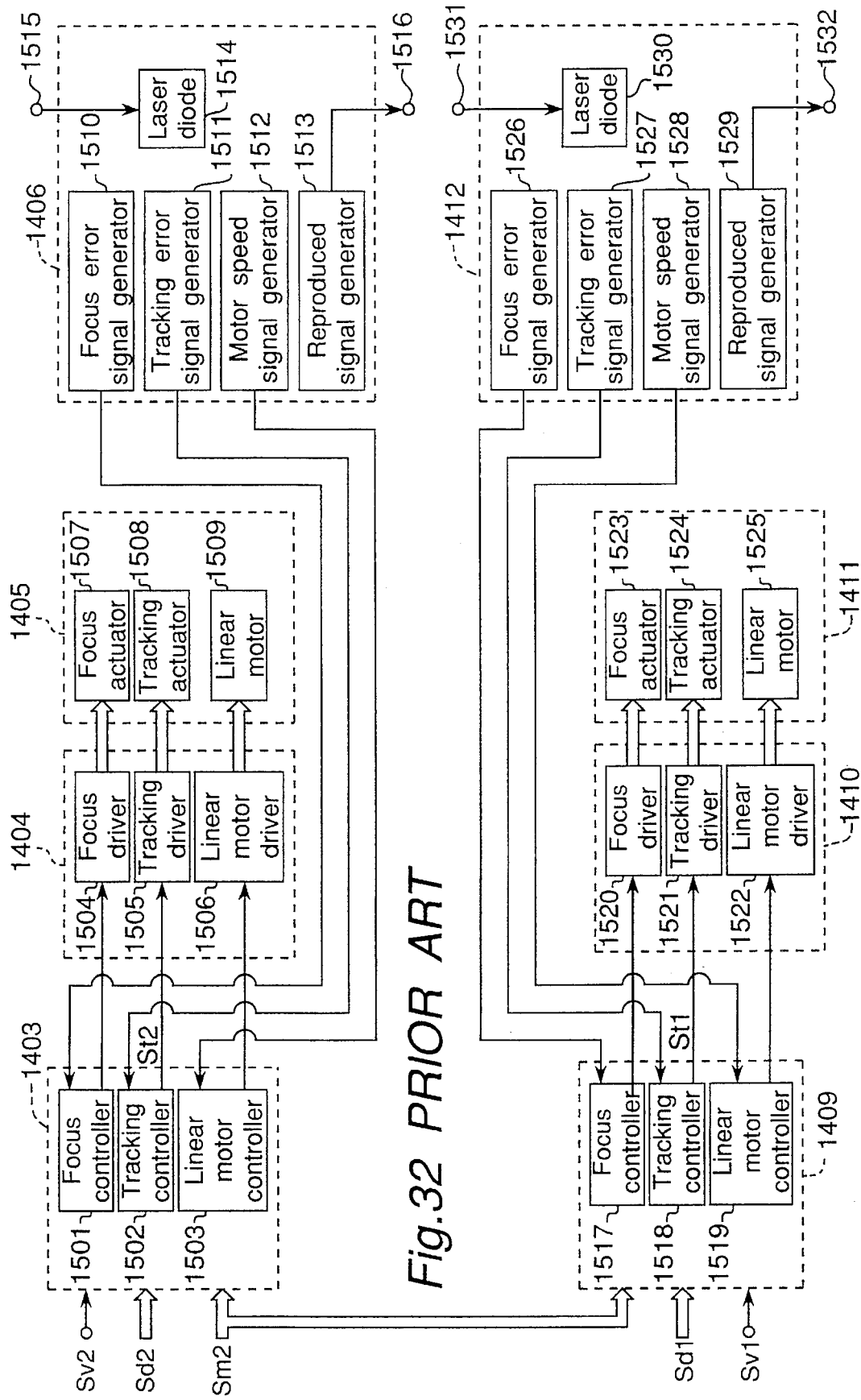
FIG. 32 is a block diagram showing the top and bottom heads actuator of the optical recording and reproducing apparatus of FIG. 31.
Figure 33:
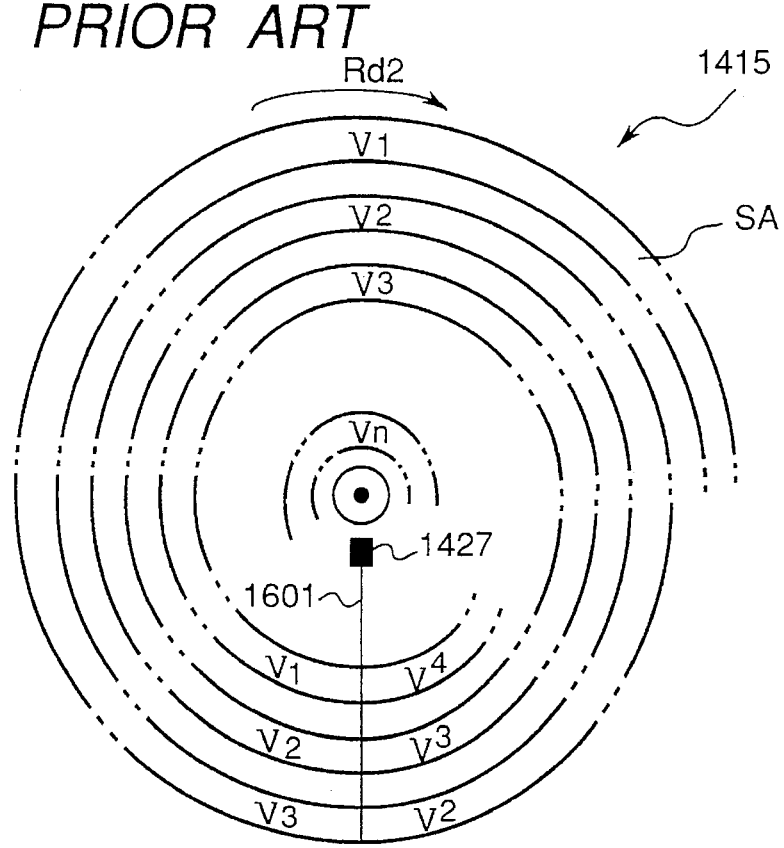
FIG. 33 is a plan view showing the top side of the optical disk which is set to the optical recording and reproducing apparatus of FIG. 31.
Figure 34:
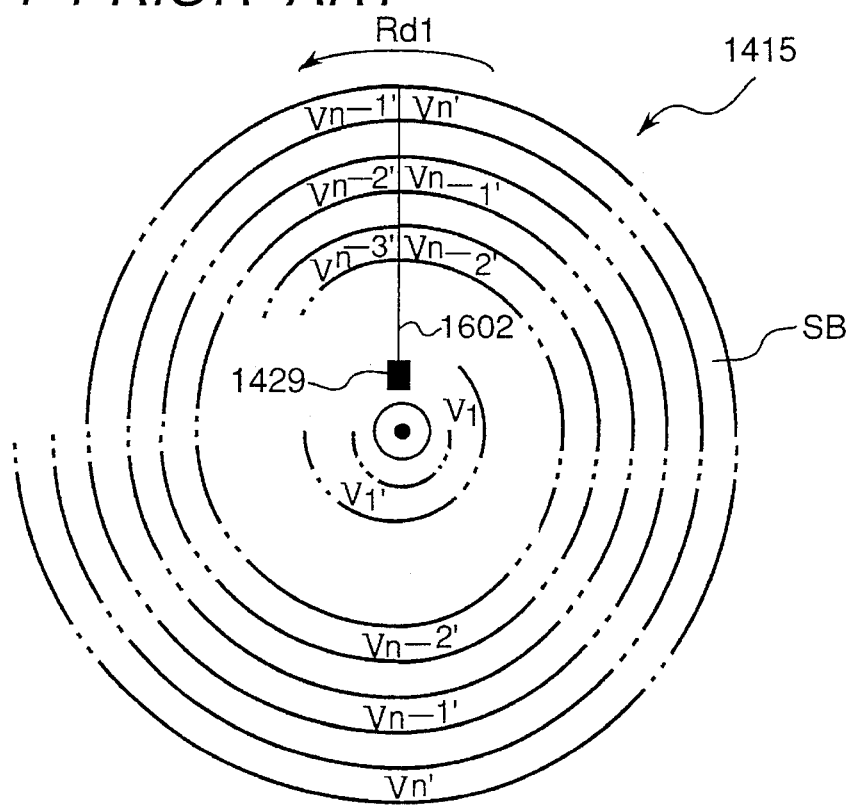
FIG. 34 is a plan view showing the bottom side of the optical disk which is set to the optical recording and reproducing apparatus of FIG. 31.

Reference to FIG. 30, a detailed construction of the Sv2 signal generator 2501 is shown. In embodiment, The reference sector data storage 2203 in FIG. 25 is replaced by another reference sector data storage 2701 connected to the signal lines B25 and B25, and a memory controller 2702 is added. The memory controller 2702 is connected to the signal line B24 and the reference sector data storage 2701 by a signal line, as shown.

The reference sector data storage 2701 stores the reference sector data Sref output from the calculator 2202, and stores thus stored data Sref to the TOC data R/W controller 2502. The memory controller 2702 executes a process for reading out of the reference sector data Sref from the reference sector data storage 2701 according to the command from the TOC data R/W controller 2502. Also the memory controller 2702 executes a process for writing the reference sector data Sref output from the TOC data R/W controller 2502 in the reference sector data storage 2701.

Figure 29:
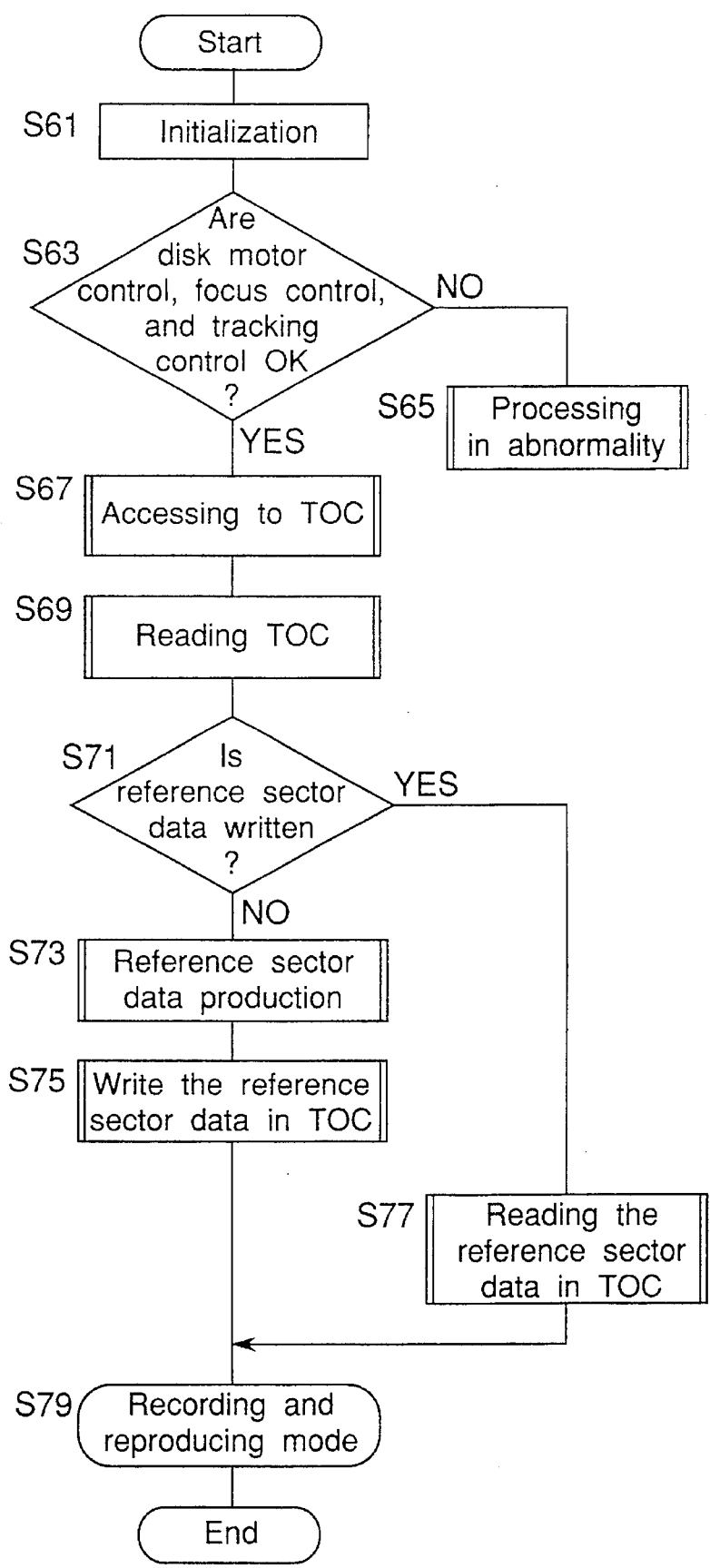
FIG. 29 is a flow chart showing the operation of the optical recording an reproducing apparatus of FIG. 28.

Referring to FIG. 29, a flow chart showing the operation of the optical recording and reproducing apparatus is shown.

At step S61, when the mode set panel 101 detects "Power on" of the apparatus 500, the mode determiner 102 initialize the apparatus 500 for the operation. The mode determiner 102 commands the motor controller 117 to rotates, the top head mode determiner 2503 and bottom head mode determiner 109 to start the focus control and the tracking control. Both head mode determines 2503 and 109 instruct the head controllers 104 and 110 to start the operation of focus control and tracking control.

At step S63, The mode determiner 2504 judges whether any of those control members 117, 104, and 110 are controlled proper without being in trouble or not, based on the information fed back therefrom to the determiner 2504. When any of control members in trouble, it is judged as "NO". Then, the procedure advances to step S65.

At step S65, the mode determiner 102 give commands such as a "control-off" or a "control re-try" to the troubled member according to the contents of the trouble. However, when it is "YES" at step S43, the procedure advances to step S67.

At step S67, the mode determiner 102 instructs the TOC data R/W controller 2502 to reproduce the TOC information. The TOC data R/W controller 2502 gives a command to the top head mode determiner 2503 to access the TOC portion 1908 together with a track address information of the TOC portion 1908. The top head mode determiner 2503 give a command with the track address information of the TOC portion 1908 to the top head controller 104 at a timing which determined based on the signals Sv1 and Sv2. The, the top head 107 accesses the track of TOC portion 1908.

At step S69, the top head controller 104 an access complete information to the mode determiner 102 when the address data Sd2 output from the ID signal generator 107 is equal to the address data of the TOC track. On receipt of the access complete information, the mode determiner 102 instructs the TOC data R/W controller 2502 to read the TOC information. The TOC data R/W controller 2502 reads the TOC information through the Sr2 signal processor 123.

At step S71, it is judged whether a writing flag for the reference sector data is set to "1" or not. When it is "YES", the data recorded in the TOC is written to the reference data storage 2701 as the reference sector data Sref. Then, the procedure advances to step S77 where the reference sector data is read out. However, it is judged "NO" at step S71, meaning that the flag is set "0", the procedure advances to step S730

At step S73, the Sv2 signal generator 2501 is driven to make the reference sector 2701 to store the reference sector data Sref.

At step S75, the TOC data R/W controller 2502 retrieves the reference sector data Sref stored in the storage 2701 and outputs this retrieved data Sref to the Sw2 signal processor 2505. The TOC information recording command is given to the recording signal processor 118 from the mode controller 102, so that the reference sector data Sref is recorded in the TOC information storing address.

At step S79, after completion of the steps 61 to 79, the operation mode shifts to the ordinal recording and reproducing operation.

Thus, by using a vertical synchronization mark detection signal, which is a reference signal for the recording and reproducing timing of the audio and video signals, to generate the setting timing of the operating mode, and setting the operating mode switching timing of the top and bottom head actuators according to the signal recording position on the disk medium no matter what timing the key information data is input to the mode setting input means or whether the positions of the vertical synchronization marks preformatted to the top and bottom sides of the disk medium are offset, the predetermined correlation between the track addresses that should be scanned by the top and bottom heads can be maintained, and a stable recording and reproducing operation can be achieved.

Furthermore, regardless of variations between the alignment of the top and bottom sides of the optical disk medium 115, the phase relationship of the rotation position detection signals VMARK1 and VMARK2, which are used for timing audio and video signal processing, will remain within the period T1. It is therefore possible to hold the timing variation of signal processing and the offset between the mode setting timing of the top and bottom heads within a predetermined range, timing control of signal processing can be simplified, and the overall circuit scale can therefore be reduced.

As described hereinabove, in an optical disk recording and reproducing apparatus according to the fifth embodiment of the invention whereby the audio and video signals for one frame are divided into top and bottom audio and video signal components, the top audio and video signal component is recorded to the predetermined track of the top side of the disk referenced to vertical synchronization marks preformatted to the top side of the disk, and the bottom audio and video signal component is recorded to the predetermined track of the bottom side of the disk referenced to vertical synchronization marks preformatted to the bottom side of the disk, even if mode information for switching the operating mode is input from an external source at any given timing, a stable recording and reproducing operation can be achieved by generating the setting timing of the head actuator operating mode based on the vertical synchronization mark detection signals of the top and bottom heads without losing the predetermined correlation between the track addresses to be scanned by each head.

In an optical disk recording and reproducing apparatus according to the invention as described above whereby the audio and video signals for one frame are divided into top and bottom audio and video signal components, the top audio and video signal component is recorded to the predetermined track of the top side of the disk referenced to vertical synchronization marks preformatted to the top side of the disk, and the bottom audio and video signal component is recorded to the predetermined track of the bottom side of the disk referenced to vertical synchronization marks preformatted to the bottom side of the disk, even if mode information for switching the operating mode is input from an external source at any given timing, a stable recording and reproducing operation providing significant real benefit can be achieved by generating the setting timing of the head actuator operating mode based on the vertical synchronization mark detection signals of the top and bottom heads without losing the predetermined correlation between the track addresses to be scanned by each head.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An optical recording and reproducing apparatus for recording to an optical disk medium comprising:

top rotation position detection information preformatted to a predetermined rotational position on side A of the disk medium, and bottom rotation position detection information preformatted to a predetermined rotational position on side B of the disk medium, wherein said recording occurs by the steps of:

dividing a plurality of audio and video signals for one frame into top and bottom audio and video signal components, recording the top audio and video signal components to a predetermined track position on disk side A referenced to the top rotation position detection information preformatted on side A, and recording the bottom audio and video signal component to a predetermined track position on disk side B referenced to the bottom rotation position detection information preformatted on side B, said apparatus comprising:

a mode setting input means for inputting a plurality of mode information for switching the operating mode of the optical disk recording and reproducing apparatus;

a mode setting means for setting the operating mode of the optical disk recording and reproducing apparatus based on the mode setting input data output from the mode setting input means;

a top optical head comprising:
  a pickup means for emitting a laser beam to disk A for recording and reproducing audio and video signals, and
  a head actuator for driving the pickup means;

a top control means for controlling the top optical head;

a top rotation position detection means for detecting the top rotation position detection information preformatted to optical disk side A, and generating a top rotation position detection signal;

a bottom optical head comprising:
  a pickup means for emitting a laser beam to disk side B for recording and reproducing audio and video signals, and
  a head actuator for driving the pickup means;

a bottom control means for controlling the bottom optical head;

a bottom rotation position detection means for detecting the bottom rotation position detection information preformatted to optical disk side B, and generating a bottom rotation position detection signal; and an optical head operating mode setting means to which the operating mode data output from the mode setting means is input and the top and bottom rotation position detection signals are input, and which sets the operating mode of the top optical head and outputs a control command to the top control means, and sets the operating mode of the bottom optical head and outputs a control command to the bottom control means;

and which is characterized by the optical head operating mode setting means outputting the operating mode of the head actuator for the top optical head at the predetermined timing to the top control means, and outputting the operating mode of the head actuator for the bottom optical head at the predetermined timing to the bottom control means, based on an input timing of the top rotation position detection signal and an input timing of the bottom rotation position detection signal.

2. An optical recording and reproducing apparatus according to claim 1 wherein the optical head operating mode setting means comprises:

a top operating mode setting means to which the operating mode data output from the mode setting means and the top rotation position detection signal are input, and which outputs the operating mode of the head actuator for the top optical head at a predetermined timing to the top control means based on the input timing of the top rotation position detection signal; and a bottom operating mode setting means to which the operating mode data output from the mode setting means, the top rotation position detection signal, and the bottom rotation position detection signal are input, and which outputs the operating mode of the head actuator for the bottom optical head at a predetermined timing to the bottom control means based on the input timing of the top rotation position detection signal and the input timing of the bottom rotation position detection signal.

3. An optical recording and reproducing apparatus according to claim 1 wherein the mode setting input means is a keyboard for mode selection.

4. An optical recording and reproducing apparatus according to claim 1 wherein the mode setting input means is a remote control device for mode selection.

5. An optical recording and reproducing apparatus according to claim 1 wherein the mode setting means is characterized by setting the operating mode of the optical disk recording and reproducing apparatus according to the mode setting input data output from the mode setting input means based on a current operation mode and a current condition of the optical disk recording and reproducing apparatus.

6. An optical recording and reproducing apparatus according to claim 1 wherein the optical head operating mode setting means comprises:

a top operating mode setting means to which the operating mode data output from the mode setting means and the top rotation position detection signal are input, and which, based on the input timing of the top rotation position detection signal, outputs the operating mode of the head actuator for the top optical head at a predetermined top timing to the top control means, and outputs an operating mode setting timing signal at a predetermined bottom timing; and a bottom operating mode setting means to which the operating mode data output from the mode setting means, the operating mode setting timing signal, and the bottom rotation position detection signal are input, and which outputs the operating mode of the head actuator for the bottom optical head at a predetermined timing to the bottom control means based on the input timing of the top rotation position detection signal and the input timing of the operating mode setting timing signal.

7. An optical recording and reproducing apparatus according to claim 1 wherein the optical head operating mode setting means comprises:

a phase difference detection means for detecting the phase difference of the top rotation position detection signal and the bottom rotation position detection signal, and outputting phase difference data;

a top operating mode setting means to which the operating mode data output from the mode setting means and the top rotation position detection signal are input, and which, based on the input timing of the top rotation position detection signal, outputs the operating mode of the head actuator for the top optical head at a predetermined top timing to the top control means, and outputs an operating mode setting timing signal at a predetermined bottom timing;

a delay means for delaying the top operating mode setting timing signal output from the top operating mode setting means for a time corresponding to the phase difference data output from the phase difference detection means, and outputting the delayed signal as the bottom operating mode setting timing signal; and a bottom operating mode setting means to which the operating mode data output from the mode setting means, and the bottom operating mode setting timing signal are input, and which outputs the operating mode of the head actuator for the bottom optical head at a predetermined timing to the bottom control means based on the input timing of the bottom operating mode setting timing signal.

8. An optical recording and reproducing apparatus according to claim 1 for an optical disk recording and reproducing apparatus for recording and reproducing video data to an optical disk comprising a spiral or plural concentric tracks divided into plural sectors, each sector being preformatted with a sector address at the beginning thereof, and characterized by:

the top rotation position detection means detecting a top predetermined sector address on disk side A, and outputting a top rotation position detection signal; and the bottom rotation position detection means detecting a bottom predetermined sector address on disk side B, and outputting a bottom rotation position detection signal.

9. An optical recording and reproducing apparatus according to claim 8 for an optical disk recording and reproducing apparatus for recording and reproducing video data to an optical disk comprising a spiral or plural concentric tracks divided into plural sectors, each sector being preformatted with a sector address at the beginning thereof, and characterized by:

the top rotation position detection means detecting a top predetermined sector address on disk side A, and outputting a top rotation position detection signal and a rotation position detection timing signal; and the bottom rotation position detection means detecting a bottom sector address on disk side B set according to the rotation position detection timing signal, and outputting a bottom rotation position detection signal information.

* * * * *